PATENT

United States Patent
Itaya

(10) Patent No.: US 10,074,982 B2
(45) Date of Patent: Sep. 11, 2018

(54) TRANSFORMER-TYPE VOLTAGE CONTROLLER, REACTIVE-POWER-ADJUSTING-TYPE VOLTAGE CONTROLLER, AND POWER-DISTRIBUTION-SYSTEM VOLTAGE CONTROL SYSTEM

(71) Applicant: Mitsubishi Electric Corporation, Chiyoda-ku, Tokyo (JP)

(72) Inventor: Nobuhiko Itaya, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 261 days.

(21) Appl. No.: 14/910,333

(22) PCT Filed: Aug. 12, 2013

(86) PCT No.: PCT/JP2013/071805
§ 371 (c)(1),
(2) Date: Feb. 5, 2016

(87) PCT Pub. No.: WO2015/022724
PCT Pub. Date: Feb. 19, 2015

(65) Prior Publication Data
US 2016/0172857 A1 Jun. 16, 2016

(51) Int. Cl.
*H02J 3/16* (2006.01)
*H02J 3/38* (2006.01)
(Continued)

(52) U.S. Cl.
CPC .............. *H02J 3/16* (2013.01); *G05B 15/02* (2013.01); *H02J 3/383* (2013.01); *H02J 3/50* (2013.01); *Y02E 10/563* (2013.01); *Y02E 40/34* (2013.01)

(58) Field of Classification Search
CPC ..... H02J 3/16; H02J 3/383; H02J 3/50; G05B 15/02; Y02E 10/563; Y02E 40/34
(Continued)

(56) References Cited

U.S. PATENT DOCUMENTS 6,680,602 B2    1/2004 Iyoda et al.

FOREIGN PATENT DOCUMENTS

JP         59-67834 A       4/1984
JP         H04317523 A   *  9/1992
(Continued)

OTHER PUBLICATIONS

*International Search Report (PCT/ISA/210) dated Dec. 24, 2013, by the Japanese Patent Office as the International Searching Authority for International Application No. PCT/JP2013/071805.
(Continued)

*Primary Examiner* — Robert E Fennema
*Assistant Examiner* — Jigneshkumar C Patel
(74) *Attorney, Agent, or Firm* — Buchanan Ingersoll & Rooney PC

(57) ABSTRACT

The transformer-type voltage controller calculates a total reactive-power integration value, a total positive-maximum reactive-power integration value, and a total negative-maximum reactive-power integration value by using reactive power generation data that includes those integration values and received from a reactive-power-control-type voltage controller, calculates a positive reactive-power margin according to the total positive-maximum reactive-power integration value and the total reactive-power integration value, and calculates a negative reactive-power margin according to the negative-maximum reactive-power integration value total and the reactive-power integration value total, and changes a tap position of a transformer-type voltage control device such that if the positive reactive-
(Continued)

power margin is smaller than a positive-side threshold, the positive reactive-power margin becomes larger than the positive-side threshold, and changes the tap position such that if the negative reactive-power margin is smaller than a negative-side threshold, the negative reactive-power margin becomes larger than the negative-side threshold.

8 Claims, 12 Drawing Sheets

(51) Int. Cl.
  *H02J 3/50* (2006.01)
  *G05B 15/02* (2006.01)

(58) Field of Classification Search
  USPC .......................................................... 700/298
  See application file for complete search history.

(56) References Cited

FOREIGN PATENT DOCUMENTS

| JP | 4-317523 A | 11/1992 |
| JP | 5-292670 A | 11/1993 |
| JP | 6-269138 A | 9/1994 |
| JP | 7-336890 A | 12/1995 |
| JP | 11-289663 A | 10/1999 |
| JP | 2000-139028 A | 5/2000 |
| JP | 2003-199253 A | 7/2003 |
| JP | 2010-57311 A | 3/2010 |
| JP | 2012-39818 A | 2/2012 |

OTHER PUBLICATIONS

*Written Opinion (PCT/ISA/237) dated Dec. 24, 2013, by the Japanese Patent Office as the International Searching Authority for International Application No. PCT/JP2013/071805.

* cited by examiner

TRANSFORMER-TYPE VOLTAGE CONTROLLER, REACTIVE-POWER-ADJUSTING-TYPE VOLTAGE CONTROLLER, AND POWER-DISTRIBUTION-SYSTEM VOLTAGE CONTROL SYSTEM

FIELD

The present invention relates to a transformer-type voltage controller, a reactive-power-adjusting-type voltage controller, and a power-distribution-system voltage control system that control the voltage of a power distribution system.

BACKGROUND

A power distribution system is generally constructed to include a high-voltage system (generally, 6600 volts) and a low-voltage system (for example, 100 volts to 200 volts), and a receiving end of a general consumer is connected to the low-voltage system. An electric power provider is required to maintain the voltage at the receiving end of a general consumer within an appropriate range (for example, in the case of receiving 100 volts, the voltage is maintained at 95 volts to 107 volts). Therefore, the electric power provider adjusts, in order to maintain the appropriate voltage at the receiving end of a general consumer, a control amount of a voltage control device (for example, an LRT (Load Ratio Control Transformer: on-load tap-changing transformer) or an SVR (Step Voltage Regulator: automatic voltage regulator)) connected to the high-voltage system. The voltage of the voltage control device is controlled by a voltage controller integrated therein or attached thereto.

A transformer-type voltage control device such as the LRT or SVR is installed for the purpose of changing the load-side voltage by a tapping operation based on LDC (Line Drop Compensator) control to adjust the voltage at all points on the load side within an appropriate range. The LDC control here is for calculating an adequate load-side voltage for adjusting the voltage at all points on the load side within an appropriate range, based on an assumption that as an electric current increases, the voltage at the end of a distribution line decreases, by using the voltage measured by the voltage control device and electric current information. The transformer-type voltage control device generally needs to suppress the change of a tap position to 30 taps or less per day on average, in order to prevent wear of the device.

The LDC control is based on the assumption that load distribution of the power distribution system is uniform, that is, the voltage at each point of the power distribution system changes in the same direction with passage of time. However, in recent years, there is a tendency that the load distribution of the power distribution system largely varies non-uniformly with passage of time, due to diversification of how electricity is used and popularization of a dispersed power system by means of photovoltaic power generation and the like. Therefore, it is difficult to estimate voltage conditions of the entire power distribution system only based on the voltage measured by the voltage control device and the current information, and maintenance at an appropriate voltage has become an issue.

Therefore, such a mechanism has been proposed that measurement information of the voltage and current at various points of the power distribution system is centralized into a so-called "central apparatus (centralized voltage controller)" via a communication network and integrated, and a target voltage is instructed from the central apparatus (the centralized voltage controller) to each of the voltage controllers.

Furthermore, in order to cope with a rapid fluctuation of the voltage associated with changes of a photovoltaic power generation amount due to the movement of clouds, application of a reactive-power-adjusting-type voltage control device such as an SVC (Static Var Compensator) or a power conditioner for photovoltaic power generation (hereinafter, "PCS (Power Conditioning System)") or the like to the power distribution system has been studied. Regarding the reactive-power-adjusting-type voltage control device, when a capacity (VA) is increased, the cost and the installation space also increase. Therefore, in the power distribution system, a single device is not suitable to cope with large voltage fluctuations, and thus is frequently used for absorbing voltage fluctuations in units of seconds.

However, even with a small capacity, dealing with large voltage fluctuations in an order of time, for example in a minute or more, has been expected, by cooperatively operating a plurality of reactive-power-adjusting-type voltage control devices by the central apparatus (the centralized voltage controller). For example, if a PCS is essential to photovoltaic power generation, it can be expected that an additional measure against the voltage problem, such as installation of a separate SVC, is made unnecessary by utilizing such cooperative control with respect to the plural power conditioning systems.

In this manner, in a state where a plurality of voltage control devices are installed in one power distribution line, it has been expected to apply a mechanism, in which the central apparatus (the centralized voltage controller) ascertains the voltage conditions of the entire power distribution system and issues an appropriate command to each of the voltage controllers, to the power distribution system in order to realize the cooperative operation between the voltage control devices.

However, the central apparatus (the centralized voltage controller) needs to regularly collect the voltage and current information at each point of the power distribution system, and the amount of information is very large. Therefore, in order to cope with a case in which the voltage fluctuates largely in several tens of seconds to several minutes, a high-speed communication network such as an optical network is required. A high-speed server and the like are also required for the central apparatus (the centralized voltage controller). Further, it is required to ensure, operate, and maintain an installation space of the central apparatus (the centralized voltage controller) and change facility data in accordance with the change of devices such as the voltage control device. At the time of introduction thereof, a scale merit is required, and for example, the system needs to be installed for each prefecture.

On the other hand, there are not many power distribution systems requiring centralized voltage control actually using the central apparatus (the centralized voltage controller) at present. It is anticipated that the number of power distribution systems requiring the centralized voltage control will increase considerably within the next 20 years. However, the rate thereof in the entire power distribution system is expected to remain a small part thereof.

Therefore, a voltage control method that can start from a small scale and can be used even in a large scale, without using a central apparatus (the centralized voltage controller) and a high-speed communication network, and has also small operation maintenance cost has been desired. As a method thereof, an autonomous and cooperative powerdistribution-system voltage controller that realizes a cooperative operation among the voltage controllers by performing communication among a plurality of the voltage controllers with a small amount of information can be considered.

CITATION LIST

Patent Literature

Patent Literature 1: Japanese Patent Application Laid-open No. H11-289663

SUMMARY

Technical Problem

In either of centralized control and autonomous and cooperative control, in a case in which a reactive-power-control-type voltage control device such as an SVC is connected to a downstream side (a load side) of the transformer-type voltage control device such as an SVR, it is an important issue how the transformer-type voltage control device and the reactive-power-control-type voltage control device are used to make the reactive-power-control-type voltage control device ensure an available capacity to generate reactive power, with an appropriate voltage being maintained. Such a voltage controller has been desired that does not cause such a state that reactive power generated by a device that operates quickly, for example, an SVC stays at a positive or negative upper limit (continues to output maximum reactive power), and the SVC becomes powerless with respect to voltage fluctuations caused thereafter.

Solution to Problem

In order to solve the aforementioned problems, a transformer-type voltage controller according to one aspect of the present invention is so constructed as to include: a communication processing unit that receives reactive power generation data, which is transmitted from a reactive-power-adjusting-type voltage controller that controls a reactive-power-adjusting-type voltage control device, the reactive power generation data including a reactive-power integration value obtained by integrating reactive power generated by the reactive-power-adjusting-type voltage control device for a preset time, and also a positive-maximum reactive-power integration value and a negative-maximum reactive-power integration value, both of which can be generated by the reactive-power-adjusting-type voltage control device, and are obtained respectively by integrating positive maximum reactive power and negative maximum reactive power for a preset time; a total value calculation unit that calculates a total reactive-power integration value that is a total of the reactive-power integration values, a total positive-maximum reactive-power integration value that is a total of the positive-maximum reactive-power integration values, and a total negative-maximum reactive-power integration value that is a total of the negative-maximum reactive-power integration values, by using the reactive-power integration values, the positive-maximum reactive-power integration values, and the negative-maximum reactive-power integration values in the reactive power generation data received at a preset calculation cycle within a preset reception time; a margin calculation unit that calculates a positive reactive-power margin according to the total positive-maximum reactive-power integration value and the total reactive-power integration value, and calculates a negative reactive-power margin according to the total negative-maximum reactive-power integration value and the total reactive-power integration value; and a margin generation unit that changes a tap position of a transformer-type voltage control device connected to a high-voltage power distribution line such that if the positive reactive-power margin is smaller than a positive-side threshold, the positive reactive-power margin becomes larger than the positive-side threshold, and changes the tap position of the transformer-type voltage control device such that if the negative reactive-power margin is smaller than a negative-side threshold, the negative reactive-power margin becomes larger than the negative-side threshold.

Advantageous Effects of Invention

According to the present invention, available capacity to generate reactive power by the reactive-power-adjusting-type voltage control device with an appropriate voltage being maintained can be ensured.

DESCRIPTION OF EMBODIMENTS

Exemplary embodiments of a transformer-type voltage controller, a reactive-power-adjusting-type voltage controller, and a power-distribution-system voltage control system according to the present invention will be explained below in detail with reference to the accompanying drawings. The present invention is not limited to the embodiments.

Embodiment

Figure 1:
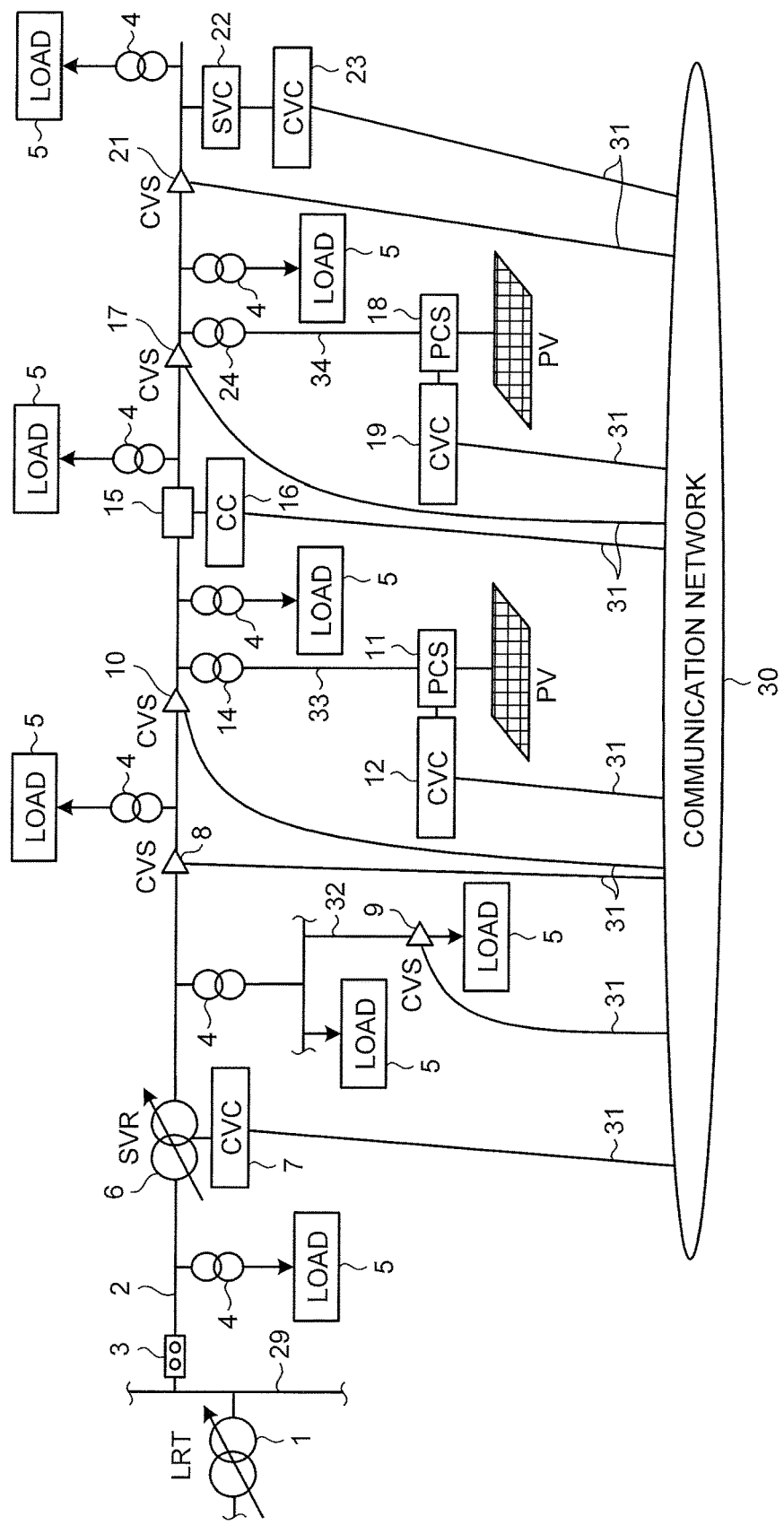
FIG. 1 is a diagram illustrating an example of a configuration of a power-distribution-system voltage control system according to an embodiment.

FIG. 1 is a diagram illustrating an example of a configuration of a power-distribution-system voltage control system according to the present embodiment. In FIG. 1, a power distribution transformer 1 is installed, for example, in an electric power substation, and includes an LRT (Load Ratio Control Transformer: on-load tap-changing transformer) as a power distribution transformer that can change a secondary-side voltage in a state with a load current being applied, and a voltage controller that controls the LRT by adjusting a tap position of the LRT.

A bus 29 is connected to a secondary side of the power distribution transformer 1, and a power distribution line 2 is connected to the bus 29. The power distribution line 2 is a high-voltage power distribution line of a high-voltage system (the voltage level is 6600 volts). An end of the power distribution line 2 is connected to the bus 29 via a breaker 3. In FIG. 1, to simplify the drawing, it is illustrated that only one power distribution line 2 is connected to the bus 29. Generally, a plurality of power distribution lines are connected to the bus on the secondary side of the power distribution transformer. Each of the power distribution lines can be configured in the same manner.

Cooperative voltage sensors (CVS) 8, 10, 17, and 21 are connected to the power distribution line 2. The cooperative voltage sensors (CVS) 8, 10, 17, and 21 can measure the voltage at respective installation sites (own terminals) thereof. In the present embodiment, voltage control of the power distribution system is executed by using only a voltage measurement value without using a current measurement value. This is because the current measurement value may become very small according to a measurement point due to recent popularization of a dispersed power system such as photovoltaic power generation, and a large error may be contained in the current measurement value. The cooperative voltage sensors (CVS) 8, 10, 17, and 21 are respectively connected to a communication network 30 via, for example, a network cable 31.

The power distribution line 2 is connected with, for example, an SVR (Step Voltage Regulator: automatic voltage regulator) 6 for compensating a voltage drop as a voltage control device. The SVR 6 is connected with a cooperative voltage controller (CVC) 7 that controls the SVR 6. The cooperative voltage controller (CVC) 7 can be provided integrally with or adjacent to the SVR 6. The cooperative voltage controller (CVC) 7 controls the SVR 6 by adjusting a control amount of the SVR 6, specifically, by adjusting a tap position thereof. The SVR 6 measures, for example, both the voltage and the current, at its installation site (its own terminal) in the power distribution line 2. The cooperative voltage controller (CVC) 7 is connected to the communication network 30 via, for example, the network cable 31.

The power distribution line 2 is connected with, for example, a static var compensator (SVC) 22 as the voltage control device. The static var compensator (SVC) 22 is connected with a cooperative voltage controller (CVC) 23 that controls the static var compensator (SVC) 22. The cooperative voltage controller (CVC) 23 can be provided integrally with or adjacent to the static var compensator (SVC) 22. The cooperative voltage controller (CVC) 23 controls the static var compensator (SVC) 22 by adjusting a control amount of the static var compensator (SVC) 22, specifically, by adjusting a reactive power output. The static var compensator (SVC) 22 measures, for example, both the voltage and the current, at its installation site (its own terminal) in the power distribution line 2. The cooperative voltage controller (CVC) 23 is connected to the communication network 30 via, for example, the network cable 31.

A switch 15 is provided on the cable of the power distribution line 2. In a state with the switch 15 being closed, an upstream side (the side on which the power distribution transformer 1 is provided, that is, a power supply side) of the switch 15 on the power distribution line 2 and a downstream side (a load side) thereof are electrically connected. In a state with the switch 15 being open, the downstream side is detached from the upstream side. The switch 15 is connected with a connection controller (CC) 16. The connection controller (CC) 16 is connected to the communication network 30 via, for example, the network cable 31. In the state with the switch 15 being open, the connection controller (CC) 16 interrupts communication between cooperative voltage controllers (CVC) 12 and 19 described later, but in the state with the switch 15 being closed, the connection controller (CC) 16 relays communication between the cooperative voltage controllers (CVC) 12 and 19. That is, the connection controller (CC) 16 has a function of interrupting the communication and a function of relaying the communication, and reflects the switching state of the switch 15 in a communication path between the cooperative voltage controllers (CVC) 12 and 19.

The power distribution line 2 is connected with a power distribution line 32 having a lower voltage than the power distribution line 2 via a transformer 4, and the power distribution line 32 is connected with, for example, a cooperative voltage sensor (CVS) 9. The power distribution line 32 is a low-voltage power distribution line with the voltage level being, for example, 100 volts to 200 volts. The cooperative voltage sensor (CVS) 9 is connected to the communication network 30 via, for example, the network cable 31. A load 5 is connected to the power distribution line 32.

The power distribution line 2 is connected with a power distribution line 33 having a lower voltage than the power distribution line 2 via a transformer 14. The power distribution line 33 is connected with a power conditioner 11 (hereinafter, "PCS (Power Conditioning System) 11"), for example, for photovoltaic power generation, as a voltage control device. The PCS 11 is connected with a cooperative voltage controller (CVC) 12 that controls the PCS 11 and a photovoltaic cell (PV) that is a power generation source. The cooperative voltage controller (CVC) 12 can be provided integrally with or adjacent to the PCS 11. The cooperative voltage controller (CVC) 12 controls the PCS 11 by adjusting a control amount from the PCS 11, specifically, by adjusting reactive power output by the PCS. The PCS 11 measures, for example, both the voltage and the current at its installation site (its own terminal) in the power distribution line 33. The cooperative voltage controller (CVC) 12 is connected to the communication network 30 via, for example, the network cable 31.

The power distribution line 2 is connected with a power distribution line 34 having a lower voltage than the power distribution line 2 via a transformer 24. The power distribution line 34 is connected with a power conditioner 18

(hereinafter, "PCS (Power Conditioning System) 18"), for example, for photovoltaic power generation, as the voltage control device. The PCS 18 is connected with a cooperative voltage controller (CVC) 19 that controls the PCS 18 and a photovoltaic cell (PV) that is a power generation source. The cooperative voltage controller (CVC) 19 can be provided integrally with or adjacent to the PCS 18. The cooperative voltage controller (CVC) 19 controls the PCS 18 by adjusting a control amount of the PCS 18, specifically, by adjusting reactive power output by the PCS. The PCS 18 measures, for example, both the voltage and the current at its installation site (its own terminal) thereof in the power distribution line 34. The cooperative voltage controller (CVC) 19 is connected to the communication network 30 via, for example, the network cable 31.

The SVR 6 and the cooperative voltage controller (CVC) 7 are provided on the power supply side (the upstream side) than the PCS 11 and the cooperative voltage controller (CVC) 12, the PCS 18 and the cooperative voltage controller (CVC) 19, the static var compensator (SVC) 22 and the cooperative voltage controller (CVC) 23, and the cooperative voltage sensors (CVS) 8, 9, 10, 17, and 21. In FIG. 1, it is illustrated that the load 5 is connected to the power distribution line 2 via the transformer 4.

In this manner, the cooperative voltage controller (CVC) is largely divided into the transformer-type cooperative voltage controller (CVC) 7 that issues a command to the transformer-type voltage control device (SVR) 6, and the reactive-power-adjusting-type cooperative voltage controllers (CVC) 12, 19, and 23 that issue a command respectively to the reactive-power-adjusting-type voltage control devices (PCS 11, PCS 18, and SVC 22). FIG. 1 illustrates an example of an arrangement configuration of a cooperative voltage controller (CVC), and generally, one or more transformer-type cooperative voltage controllers (CVC) and one or more reactive-power-adjusting-type cooperative voltage controllers (CVC) are provided. The transformer-type voltage control device has voltage control characteristics of uniformly moving the voltage up and down on the load side by changing the tap position, but hardly moving the voltage up and down on the power supply side. The reactive-power-adjusting-type voltage control device has voltage control characteristics of uniformly moving the voltage up and down on the load side by controlling reactive power supplied to the power distribution line, and moving the voltage up and down on the power supply side in proportion to line impedance from the power distribution transformer 1. Therefore, in the reactive-power-adjusting-type voltage control device, a voltage variation range with respect to the same reactive power change decreases as it comes closer to the power distribution transformer 1.

Configurations of the cooperative voltage sensors (CVS) 8, 9, 10, 17, and 21 are described next. The cooperative voltage sensor (CVS) 8 is described below; however, the configurations of the cooperative voltage sensors (CVS) 9, 10, 17, and 21 are identical thereto. The cooperative voltage sensor (CVS) 8 can perform measurement, edition, and monitoring of the voltage, and can issue a target-voltage change request. Measurement here is to measure the voltage at its own terminal, and edition is to calculate, for example, a voltage moving average value, and monitoring is to monitor voltage fluctuations. The target-voltage change request is issued, for example, when the latest voltage moving average value deviates from the range of appropriate-voltage upper/lower limits, as described below.

Figure 2:
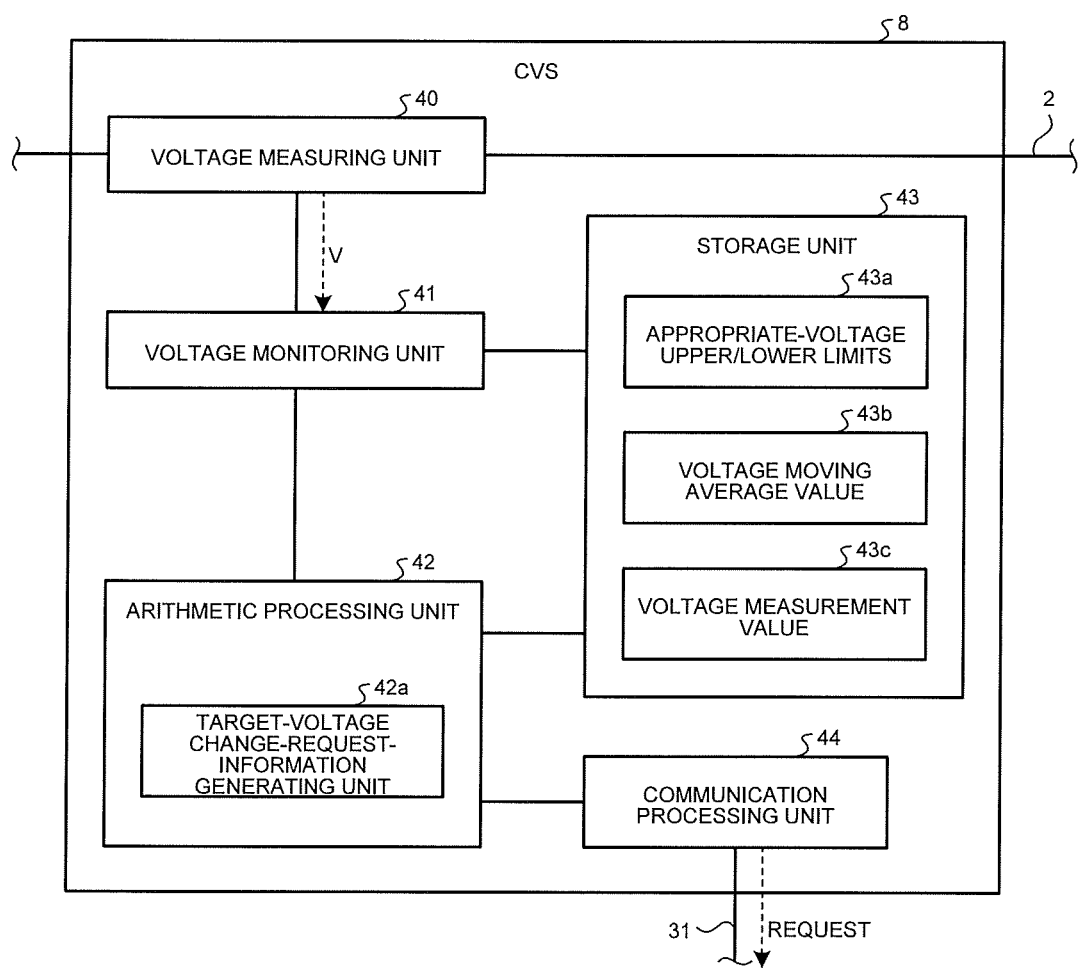
FIG. 2 is a diagram illustrating an example of a configuration of a cooperative voltage sensor (CVS).

FIG. 2 is a diagram illustrating an example of a configuration of the cooperative voltage sensor (CVS) 8. As illustrated in FIG. 2, the cooperative voltage sensor (CVS) 8 includes a voltage measuring unit 40, a voltage monitoring unit 41, an arithmetic processing unit 42, a storage unit 43, and a communication processing unit 44.

The voltage measuring unit 40 is connected to the power distribution line 2 to measure the voltage of the power distribution line 2 at a connected site, for example, for each preset cycle.

The voltage monitoring unit 41 acquires the voltage measurement value (V) measured by the voltage measuring unit 40, for example, for each preset cycle, and sends the acquired voltage measurement value (V) to the arithmetic processing unit 42.

The arithmetic processing unit 42 performs various kinds of arithmetic processing and the like. Specifically, the arithmetic processing unit 42 stores the latest voltage measurement value in the storage unit 43 as a voltage measurement value 43c, every time the latest voltage measurement value is acquired from the voltage monitoring unit 41. The voltage measurement value 43c is stored, for example, for a predetermined period of time. Further, the arithmetic processing unit 42 calculates a voltage moving average value 43b generally by using the past voltage measurement values 43c already stored in the storage unit 43 and the latest voltage measurement value 43c, every time the latest voltage measurement value is acquired from the voltage monitoring unit 41, and stores the voltage moving average value 43b in the storage unit 43. The voltage moving average value 43b is a mean value of the voltage measurement values 43c in the past predetermined period of time, based on the latest voltage measurement time point as a reference, and is calculated by using the past voltage measurement values 43c and the latest voltage measurement value 43c. The voltage moving average value 43b is stored, for example, for a predetermined period of time. Appropriate-voltage upper/lower limits 43a are stored beforehand in the storage unit 43. The appropriate-voltage upper/lower limits 43a include an appropriate voltage upper limit and an appropriate voltage lower limit, and define an appropriate voltage range to be maintained for a predetermined section of the power distribution line 2 including the voltage measurement point of the cooperative voltage sensor (CVS) 8. The appropriate-voltage upper/lower limits 43a can be set variably in terms of time.

The arithmetic processing unit 42 has a function of issuing a target-voltage change request, in addition to the arithmetic processing function described above. That is, the arithmetic processing unit 42 includes a target-voltage change-request-information generating unit 42a, thereby to generate target-voltage change-request information, for example, when the latest voltage moving average value 43b deviates from the range of the appropriate-voltage upper/lower limits 43a. At the time of determining a deviation from the range of the appropriate-voltage upper/lower limits 43a, a value other than the voltage moving average value 43b can be used. For example, the voltage is measured periodically, and if a deviation from the range of the appropriate-voltage upper/lower limits occurs continuously for more than a predetermined number of times, it can be determined as abnormal. Any determination method can be used, so long as it is not determined as a deviation if the deviation is resolved within a matter of seconds, and it is determined as a deviation only when the deviation occurs for a certain long period of time.

The arithmetic processing unit 42 transmits the target-voltage change-request information to a preset cooperative voltage controller (CVC), in the case of the cooperative voltage sensor (CVS) 8, to the cooperative voltage controller (CVC) 12, via the communication processing unit 44. Note that the communication processing unit 44 is connected to the network cable 31 to perform communication. The target-voltage change-request information includes a change amount and a change direction of the voltage. The change direction represents an increase or a decrease. As described later, target-voltage upper/lower limits are predetermined respectively for each of the cooperative voltage controllers (CVC), and each cooperative voltage controller (CVC) executes voltage control such that the voltage at its own terminal is maintained within the range of its own target-voltage upper/lower limits. Upon reception of a target-voltage change request, the cooperative voltage controller (CVC) changes and resets the target-voltage upper/lower limits according to the request contents.

The configuration described above is identical for the cooperative voltage sensors (CVS) 10, 17, and 21. In FIG. 2, if the power distribution line 2 is changed to the power distribution line 32, the identical configuration can be used for the cooperative voltage sensor (CVS) 9.

Configurations of the cooperative voltage controllers (CVC) 7, 12, 19, and 23 are described next. The cooperative voltage controllers (CVC) 7, 12, 19, and 23 perform collection, edition, and monitoring of voltage measurement values respectively from the voltage control devices (the SVR 6, the PCS 11, the PCS 18, and the SVC 22), and perform output or the like of a target-voltage value command to the voltage control devices. The cooperative voltage controllers (CVC) 7, 12, 19, and 23 also have a function of requesting a change of the target voltage. Collection here is to acquire a voltage measurement value at the own terminal, which has been measured by the voltage control device, for example, for each preset cycle from the voltage control device. Edition is to calculate, for example, a voltage moving average value by using the collected voltage measurement values, and monitoring is to monitor voltage fluctuations at the own terminal. The target-voltage value command is a control command for transmitting a target-voltage upper/lower limits to the voltage control device so that the voltage control device operates to adjust the voltage at each own terminal within the range of the target-voltage upper/lower limits. A target-voltage change request is issued, for example, when the latest voltage moving average value deviates from the range of appropriate-voltage upper/lower limits.

The configurations of the reactive-power-adjusting-type cooperative voltage controllers (CVC) 12, 19, and 23 are described next. The configuration of the cooperative voltage controller (CVC) 12 is described below; however, the configurations of the cooperative voltage controllers (CVC) 19 and 23 are identical thereto.

Figure 3:
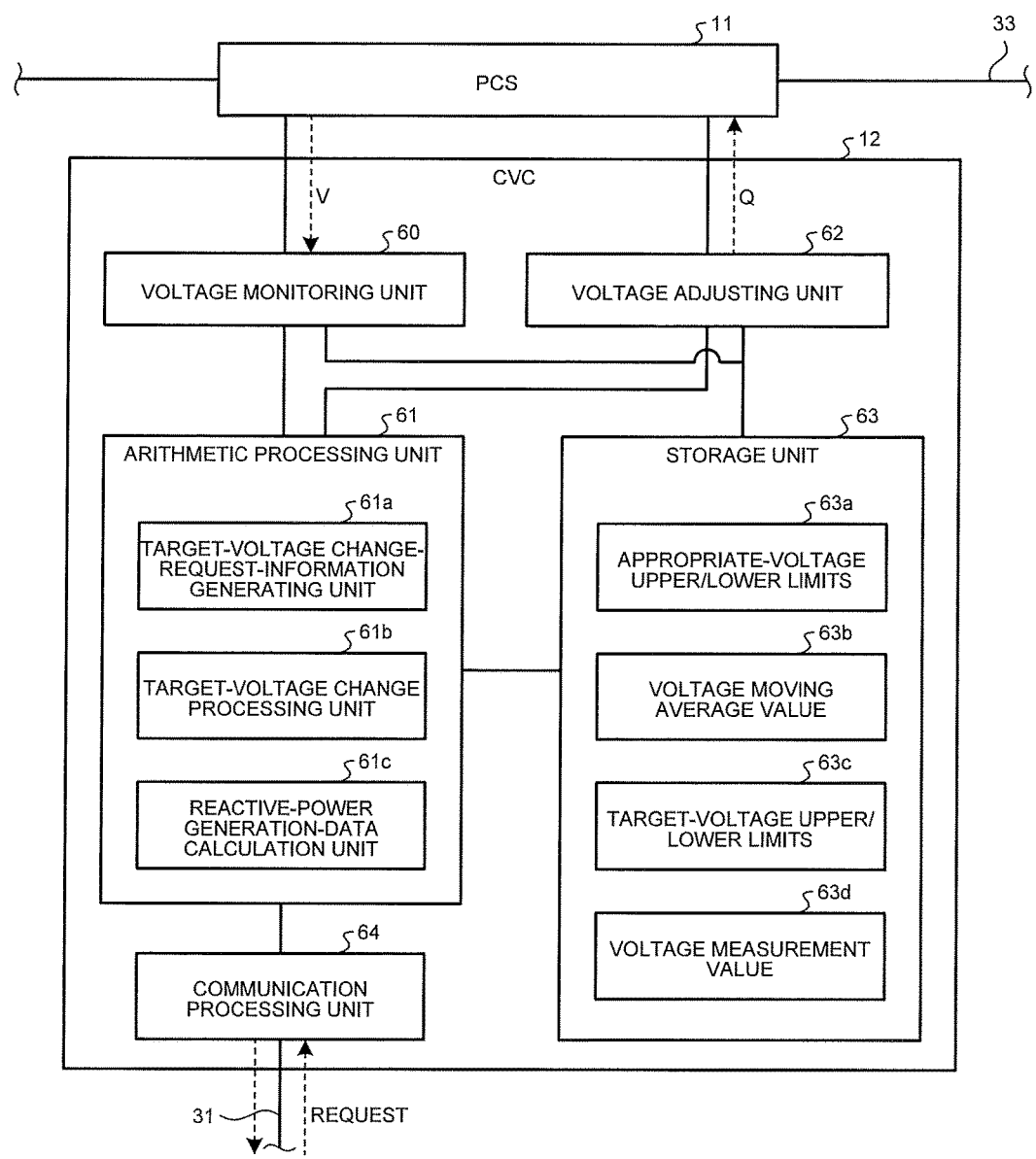
FIG. 3 is a diagram illustrating an example of a configuration of a cooperative voltage controller (CVC).

FIG. 3 is a diagram illustrating an example of the configuration of the cooperative voltage controller (CVC) 12. As illustrated in FIG. 3, the cooperative voltage controller (CVC) 12 includes a voltage monitoring unit 60, an arithmetic processing unit 61, a voltage adjusting unit 62, a storage unit 63, and a communication processing unit 64.

The voltage monitoring unit 60 acquires a voltage measurement value (V) measured by the PCS 11, for example, for each preset cycle, and sends the voltage measurement value (V) to the arithmetic processing unit 61.

The arithmetic processing unit 61 performs various kinds of arithmetic processing and the like. Specifically, the arithmetic processing unit 61 stores the latest voltage measurement value in the storage unit 63 as a voltage measurement value 63*d*, every time the latest voltage measurement value is acquired from the voltage monitoring unit 60. The voltage measurement value 63*d* is stored for a predetermined period of time. Further, the arithmetic processing unit 61 calculates, for example, a voltage moving average value 63*b* generally by using the past voltage measurement values 63*d* already stored in the storage unit 63 and the latest voltage measurement value 63*d*, every time the latest voltage measurement value is acquired from the voltage monitoring unit 60, and stores the voltage moving average value 63*b* in the storage unit 63. The voltage moving average value 63*b* is a mean value of the voltage measurement values 63*d* in the past predetermined period of time, according to the latest voltage measurement time point as a reference, and is calculated by using the past voltage measurement values 63*d* and the latest voltage measurement value 63*d*. The voltage moving average value 63*b* is stored, for example, for a predetermined period of time. Appropriate-voltage upper/lower limits 63*a* are stored beforehand in the storage unit 63. The appropriate-voltage upper/lower limits 63*a* include an appropriate voltage upper limit and an appropriate voltage lower limit, and define an appropriate voltage range to be maintained for a predetermined section of the power distribution line 33 including the voltage measurement point of the PCS 11. The appropriate-voltage upper/lower limits 63*a* can be set variably in terms of time. Target-voltage upper/lower limits 63*c* are stored beforehand in the storage unit 63. The target-voltage upper/lower limits 63*c* include a target-voltage upper limit and a target-voltage lower limit, and define a control-target voltage range of the cooperative voltage controller (CVC) 12.

The arithmetic processing unit 61 includes a target-voltage change-request-information generating unit 61*a*. The target-voltage change-request-information generating unit 61*a* generates target-voltage change-request information, for example, when the latest voltage moving average value 63*b* deviates from the range of the appropriate-voltage upper/lower limits 63*a*. The target-voltage change-request information includes a change amount and a change direction of the voltage. The arithmetic processing unit 61 transmits the target-voltage change-request information to a preset cooperative voltage controller (CVC), in the case of the cooperative voltage controller (CVC) 12, to the cooperative voltage controller (CVC) 7 via the communication processing unit 64. The communication processing unit 64 is connected to the network cable 31 to perform communication.

The arithmetic processing unit 61 includes a target-voltage change processing unit 61*b*. Upon reception of target-voltage change-request information transmitted from another cooperative voltage controller (CVC) or the cooperative voltage sensor (CVS), the target-voltage change processing unit 61*b* can update and reset the target-voltage upper/lower limits 63*c* stored in the storage unit 63, according to the change amount and the change direction of the voltage included in the target-voltage change-request information.

The arithmetic processing unit 61 includes a reactive-power generation-data calculation unit 61*c*. The reactive-power generation-data calculation unit 61*c* monitors reactive power Q output from the voltage adjusting unit 62, to calculate a reactive-power integration value $\Sigma Q$, which is an amount obtained by integrating the reactive power Q for a preset time T (for example, 10 minutes), for each cycle T.

Figure 4:
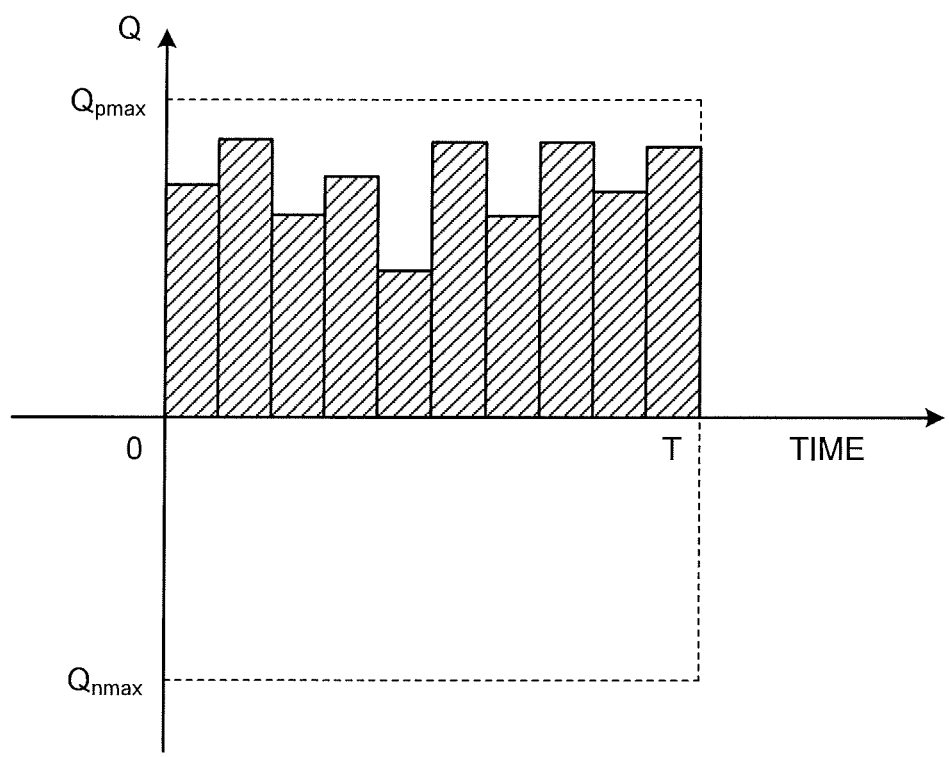
FIG. 4 is a diagram illustrating an example of a time change in a reactive power Q within a certain time T.

The reactive-power generation-data calculation unit 61*c* also calculates an integration value, which is a value obtained by integrating positive maximum reactive power and negative maximum reactive power that can be generated by the cooperative voltage controller (CVC) 12 within the certain time T for the preset time T, in addition to the calculation of the reactive-power integration value $\Sigma Q$. That is, when it is assumed that the positive maximum reactive power that can be generated by the cooperative voltage controller (CVC) 12 within the certain time T is $Q_{pmax}$ (>0) and the negative maximum reactive power is $Q_{nmax}$ (<0), the $Q_{pmax}$ and the $Q_{nmax}$ are known values determined by rating. Therefore, the reactive-power generation-data calculation unit 61c calculates a positive-maximum reactive-power integration value $\Sigma Q_{pmax}$ that is an amount obtained by integrating $Q_{pmax}$ for the preset time T, and a negative-maximum reactive-power integration value $\Sigma Q_{nmax}$ that is an amount obtained by integrating $Q_{nmax}$ for the preset time T. Note that positive-maximum reactive-power $Q_{pmax}$, and the negative-maximum reactive-power $Q_{nmax}$ are certain values for each facility. An example of the reactive power Q within the certain time T, the positive maximum reactive power $Q_{pmax}$, and the negative maximum reactive power $Q_{nmax}$ are illustrated in FIG. 4, and the reactive-power integration value $\Sigma Q$ is illustrated by a diagonal line. In this case, the positive-maximum reactive-power integration value $\Sigma Q_{pmax}$ is provided by $Q_{pmax} \cdot T$, and the negative-maximum reactive-power integration value $\Sigma Q_{nmax}$ is provided by $Q_{nmax} \cdot T$.

Furthermore, the reactive-power generation-data calculation unit 61c transmits the reactive power generation data (the reactive-power integration value $\Sigma Q$, the positive-maximum reactive-power integration value $\Sigma Q_{pmax}$, and the negative-maximum reactive-power integration value $\Sigma Q_{nmax}$) to a predetermined transformer-type cooperative voltage controller (CVC) 7, together with a network address of its own device (a network address of the cooperative voltage controller (CVC) 12) via the communication processing unit 64, periodically at regular intervals of the certain time T. The transformer-type cooperative voltage controller (CVC) 7 set as a destination is a transformer-type cooperative voltage controller on the upstream side of the cooperative voltage controller (CVC) 12 and the closest thereto. The certain time T is, for example, 5 minutes.

The voltage adjusting unit 62 determines whether a voltage measurement value output from the voltage monitoring unit 60 is within the range of the target-voltage upper/lower limits 63c. If the voltage measurement value deviates from the range of the target-voltage upper/lower limits 63c, the voltage adjusting unit 62 controls reactive power output by the PCS 11 so as to maintain the voltage within the range of the target-voltage upper/lower limits 63c. The PCS 11 controls the voltage by generating the reactive power Q according to the control of the voltage adjusting unit 62. The reactive power Q is defined such that it has a negative value when the reactive power is fed to the power distribution system, and has a positive value when the reactive power is drawn in from the power distribution system. By generating the negative reactive power, that is, by feeding the reactive power to the power distribution system, the voltage can be increased. By generating the positive reactive power, that is, by drawing in the reactive power from the power distribution system, the voltage can be decreased.

Figure 5:
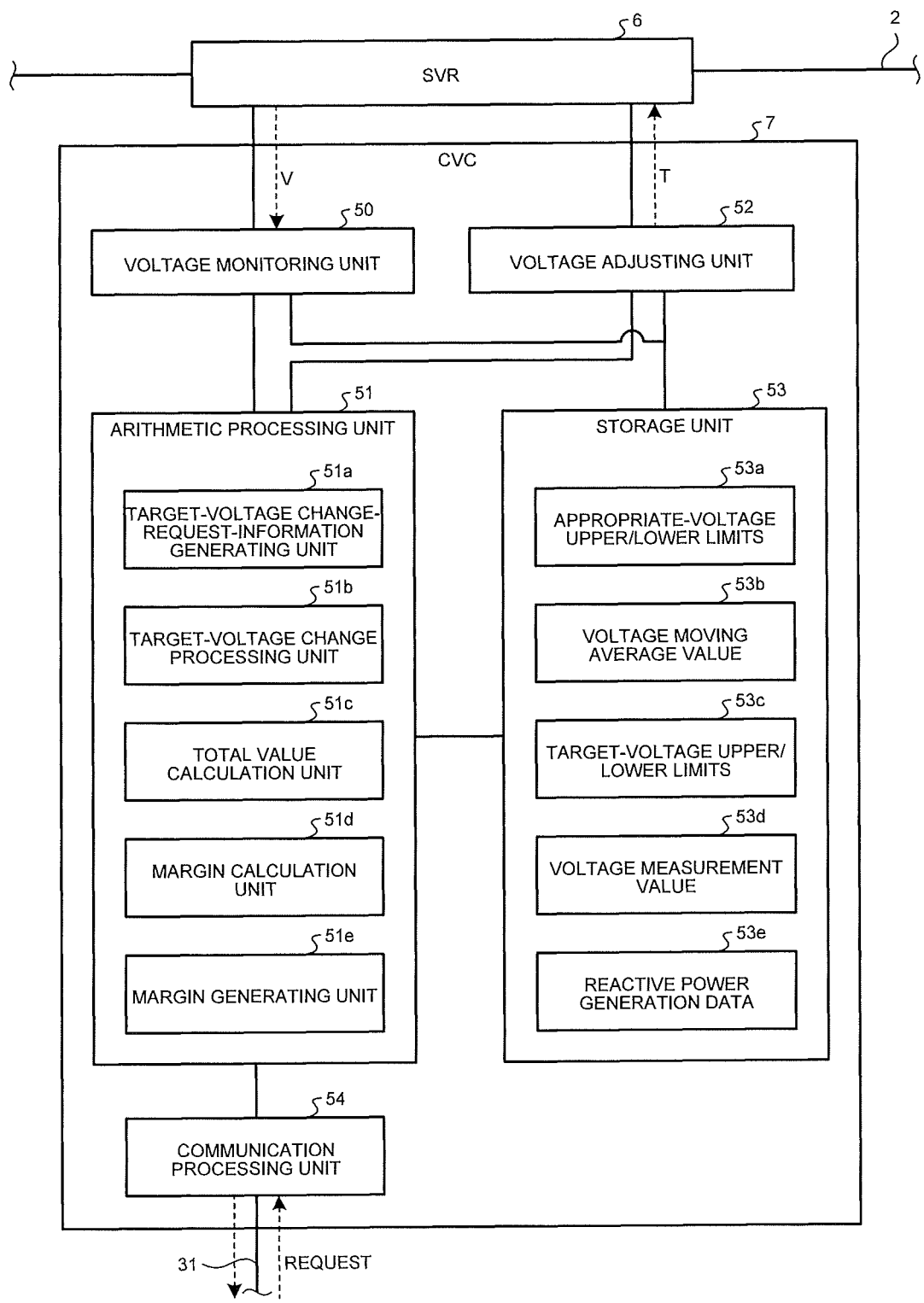
FIG. 5 is a diagram illustrating an example of a configuration of a cooperative voltage controller (CVC).

The configuration of the transformer-type cooperative voltage controller (CVC) 7 is described next. FIG. 5 is a diagram illustrating an example of the configuration of the cooperative voltage controller (CVC) 7. As illustrated in FIG. 5, the cooperative voltage controller (CVC) 7 includes a voltage monitoring unit 50, an arithmetic processing unit 51, a voltage adjusting unit 52, a storage unit 53, and a communication processing unit 54.

The voltage monitoring unit 50 acquires a voltage measurement value (V) measured by the SVR 6, for example, for each preset cycle, and sends the acquired voltage measurement value (V) to the arithmetic processing unit 51.

The arithmetic processing unit 51 performs various kinds of arithmetic processing and the like. Specifically, the arithmetic processing unit 51 stores the latest voltage measurement value in the storage unit 53 as a voltage measurement value 53d, every time the latest voltage measurement value is acquired from the voltage monitoring unit 50. The voltage measurement value 53d is stored, for example, for a predetermined period of time. Further, the arithmetic processing unit 51 calculates a voltage moving average value 53b generally by using the past voltage measurement values 53d already stored in the storage unit 53 and the latest voltage measurement value 53d, every time the latest voltage measurement value is acquired from the voltage monitoring unit 50, and stores the voltage moving average value 53b in the storage unit 53. The voltage moving average value 53b here is a mean value of the voltage measurement values 53d in the past predetermined period of time, based on the latest voltage measurement time point as a reference, and is calculated by using the past voltage measurement values 53d and the latest voltage measurement value 53d. The voltage moving average value 53b is stored, for example, for a predetermined period of time. Appropriate-voltage upper/lower limits 53a are stored beforehand in the storage unit 53. The appropriate-voltage upper/lower limits 53a include an appropriate voltage upper limit and an appropriate voltage lower limit, and define an appropriate voltage range to be maintained for a predetermined section of the power distribution line 2 including the voltage measurement point of the SVR 6. The appropriate-voltage upper/lower limits 53a can be set variably in terms of time. Target-voltage upper/lower limits 53c are stored beforehand in the storage unit 53. The target-voltage upper/lower limits 53c include a target-voltage upper limit and a target-voltage lower limit, and define a control-target voltage range of the cooperative voltage controller (CVC) 7.

The arithmetic processing unit 51 includes a target-voltage change-request-information generating unit 51a. The target-voltage change-request-information generating unit 51a generates target-voltage change-request information, for example, when the latest voltage moving average value 53b deviates from the range of the appropriate-voltage upper/lower limits 53a. The target-voltage change-request information includes a change amount and a change direction of the voltage. The arithmetic processing unit 51 transmits the target-voltage change-request information to a preset cooperative voltage controller (CVC), in the case of the cooperative voltage controller (CVC) 7, to the cooperative voltage controller (CVC) 12, via the communication processing unit 54. The communication processing unit 54 is connected to the network cable 31 to perform communication.

The transformer-type cooperative voltage controller (CVC) 7 can have a configuration in which the target-voltage change-request-information generating unit 51a is not provided. Alternatively, the configuration may be such that the function of the target-voltage change-request-information generating unit 51a is invalidated, or the target-voltage change-request information generated by the target-voltage change-request-information generating unit 51a is not transmitted. It is assumed below that, for example, the transformer-type cooperative voltage controller (CVC) 7 does not issue a target-voltage change request by itself.

The arithmetic processing unit 51 includes a target-voltage change processing unit 51b. Upon reception of target-voltage change-request information from another cooperative voltage controller (CVC) or the cooperative voltage sensor (CVS), the target-voltage change processing unit 51b can update and reset the target-voltage upper/lower limits 53c stored in the storage unit 53, based on the change amount and the change direction of the voltage included in the target-voltage change-request information. Generally, the communication processing unit 54 of the cooperative voltage controller (CVC) can transmit the target-voltage change-request information received from a certain device to another device. However, it is assumed below that the transformer-type cooperative voltage controller (CVC) 7 does not transfer the target-voltage change-request information received from a certain device to another device.

The communication processing unit 54 receives the reactive power generation data (the reactive-power integration value $\Sigma Q$, the positive-maximum reactive-power integration value $\Sigma Q_{pmax}$, and the negative-maximum reactive-power integration value $\Sigma Q_{nmax}$) respectively transmitted from the reactive-power-adjusting-type cooperative voltage controllers (CVC) 12, 19, and 23 that execute voltage cooperative control, and a network address of a source. Every time the communication processing unit 54 receives the reactive power generation data, the arithmetic processing unit 51 stores the reactive power generation data in the storage unit 53 as reactive power generation data 53e. The reactive power generation data 53e is stored, for example, for a predetermined period of time. The cooperative voltage controllers (CVC) 12, 19, and 23 transmit the reactive power generation data to the transformer-type cooperative voltage controller (CVC) 7 at regular intervals of the certain time T. However, time required for transmission varies according to the state of the communication network. Therefore, the time interval for receiving the reactive power generation data respectively from the cooperative voltage controllers (CVC) 12, 19, and 23 by the communication processing unit 54 is in a range before and after the certain time T.

Furthermore, there is an upper limit in the number of pieces of reactive power generation data that can be received per unit time by the transformer-type cooperative voltage controller (CVC). Therefore, the timing at which the reactive-power-adjusting-type cooperative voltage controller (CVC) transmits the reactive power generation data should be adjusted so as not to exceed the upper limit.

The arithmetic processing unit 51 can determine the source of the received reactive power generation data based on the network address of the source, which has been received together with the reactive power generation data.

The transmission cycle of the reactive power generation data by the reactive-power-adjusting-type voltage controller may not be the certain time T. For example, the reactive power generation data can be transmitted at a half cycle of the certain time T. The cycle can be larger than the certain time T, or can be other than the preset cycle. There can be a reactive-power-adjusting-type voltage controller having a different transmission cycle.

It is assumed below that the reactive power integration value, the positive-maximum reactive-power integration value, and the negative-maximum reactive-power integration value transmitted from the cooperative voltage controller (CVC) 12 are respectively $\Sigma Q_{12}$, $\Sigma Q_{pmax,12}$, and $\Sigma Q_{nmax,12}$, the reactive power integration value, the positive-maximum reactive-power integration value, and the negative-maximum reactive-power integration value transmitted from the cooperative voltage controller (CVC) 19 are respectively $\Sigma Q_{19}$, $\Sigma Q_{pmax,19}$, and $\Sigma Q_{nmax,19}$, and the reactive power integration value, the positive-maximum reactive-power integration value, and the negative-maximum reactive-power integration value transmitted from the cooperative voltage controller (CVC) 23 are respectively $\Sigma Q_{23}$, $\Sigma Q_{pmax,23}$, and $\Sigma Q_{nmax,23}$.

The arithmetic processing unit 51 further includes a total value calculation unit 51c, a margin calculation unit 51d, and a margin generating unit 51e.

The total value calculation unit 51c calculates a total reactive-power integration value that is a total of the reactive power integration values, a total positive-maximum reactive-power integration value that is a total of the positive-maximum reactive-power integration values, and a total negative-maximum reactive-power integration value that is a total of the negative-maximum reactive-power integration values in a preset calculation cycle, by using the reactive power integration values, the positive-maximum reactive-power integration values, and the negative-maximum reactive-power integration values in the reactive power generation data 53e received within a preset reception time. The preset reception time here is, for example, the certain time T, and the preset calculation cycle is, for example, about ⅕ to 1/10 of the certain time T. However, a reception time and a calculation cycle other than these can be also used. Specifically, the total value calculation unit 51c calculates the reactive-power integration value total ($\Sigma Q_{12}+\Sigma Q_{19}+\Sigma Q_{23}$), the positive-maximum reactive-power integration value total ($\Sigma Q_{pmax,12}+\Sigma Q_{pmax,19}+\Sigma Q_{pmax,23}$), and the negative-maximum reactive-power integration value total ($\Sigma Q_{nmax,12}+\Sigma Q_{nmax,19}+\Sigma Q_{nmax,23}$) by using the reactive power generation data 53e respectively received from the reactive-power-adjusting-type cooperative voltage controllers (CVC) 12, 19, and 23, for example, within the past certain time T.

The margin calculation unit 51d calculates a positive reactive-power margin based on the positive-maximum reactive-power integration value total and the reactive-power integration value total, and calculates a negative reactive-power margin based on the negative-maximum reactive-power integration value total and the reactive-power integration value total. Specifically, the margin calculation unit 51d calculates $1-(\Sigma Q_{12}+\Sigma Q_{19}+\Sigma Q_{23})/(\Sigma Q_{pmax,12}+\Sigma Q_{pmax,19}+\Sigma Q_{pmax,23})$, for example, as the positive reactive-power margin, and calculates $1-(\Sigma Q_{12}+\Sigma Q_{19}+\Sigma Q_{23})/(\Sigma Q_{nmax,12}+\Sigma Q_{nmax,19}+\Sigma Q_{nmax,23})$ as the negative reactive-power margin. The positive reactive-power margin represents the degree of margin of the reactive-power integration value total with respect to the positive-maximum reactive-power integration value total, and the negative reactive-power margin represents the degree of margin of the reactive-power integration value total with respect to the negative-maximum reactive-power integration value total.

If the positive reactive-power margin is smaller than a positive-side threshold (for example, p=0.2), the margin generating unit 51e changes the tap position of the SVR 6 such that the positive reactive-power margin becomes larger than the positive-side threshold, and if the negative reactive-power margin is smaller than a negative-side threshold (for example, p=0.2), the margin generating unit 51e also changes the tap position of the SVR 6 such that the negative reactive-power margin becomes larger than the negative-side threshold. Specifically, for example, in the case of $1-(\Sigma Q_{12}+\Sigma Q_{19}+\Sigma Q_{23})/(\Sigma Q_{pmax,12}+\Sigma Q_{pmax,19}+\Sigma Q_{pmax,23})<p$ or $1-(\Sigma Q_{12}+\Sigma Q_{19}+\Sigma Q_{23})/(\Sigma Q_{nmax,12}+\Sigma Q_{nmax,19}+\Sigma Q_{nmax,23})<p$, the margin generating unit 51e determined that available capacity to generate reactive power is not ensured as a whole and changes the tap position of the SVR 6 such that the available capacity to generate reactive power is ensured. At this time, if the positive reactive-power margin is smaller than the positive-side threshold, the margin generating unit 51e changes the tap position of the SVR 6 so that the positive reactive-power margin becomes larger than the positive-side threshold. If the negative reactive-power margin is smaller than the negative-side threshold, the margin generating unit 51e changes the tap position of the SVR 6 such that the negative reactive-power margin becomes larger than the negative-side threshold.

The voltage adjusting unit 52 determines whether a voltage measurement value output from the voltage monitoring unit 50 is within the range of the target-voltage upper/lower limits 53c. If the voltage measurement value deviates from the range of the target-voltage upper/lower limits 53c, the voltage adjusting unit 52 adjusts the tap position of the SVR 6 so that the voltage is maintained within the range of the target-voltage upper/lower limits 53c. The SVR 6 controls the voltage by adjusting a tap position T according to the control of the voltage adjusting unit 52.

An operation of the power-distribution-system voltage control system according to the present embodiment is described next. A normal voltage control operation of the cooperative voltage controller (CVC) is described first.

The normal voltage control operation of the reactive-power-adjusting-type cooperative voltage controller (CVC) is described. The normal voltage control operation is common to the cooperative voltage controllers (CVC) 12, 19, and 23, and thus the voltage control operation is described without particularly adding reference signs. The reactive-power-adjusting-type cooperative voltage controller (CVC) monitors a voltage measurement value at the own terminal in a short cycle (for example, in a cycle of 100 milliseconds), compares the voltage measurement value with the target-voltage upper/lower limits to determine if there is a deviation of the voltage measurement value from the range of the target-voltage upper/lower limits. If the deviation continues, the reactive-power-adjusting-type cooperative voltage controller (CVC) adds or subtracts a deviation amount to or from a control amount, and if there is no deviation, resets the deviation amount. If the deviation amount exceeds a preset threshold, the reactive-power-adjusting-type cooperative voltage controller (CVC) issues a reactive-power output command to the voltage control devices such as the PCS by PID (Proportional Integral Differential) control so as to adjust the voltage within the target-voltage upper/lower limits. Such control is executed by the voltage adjusting unit 62 (FIG. 3).

It is assumed that initial values of the target-voltage upper/lower limits of the reactive-power-adjusting-type cooperative voltage controller (CVC) (when a target-voltage change request has not been received) are values obtained by, for example, adding or subtracting a certain dead zone (for example, 0.5% of the voltage moving average value) to or from a moving average value of the voltage measurement value (for example, the voltage moving average value for one minute) at the own terminal. Accordingly, in a state where a target-voltage change request has not been received, an available capacity to generate reactive power on the positive side and the negative side is sufficient, and the reactive-power-adjusting-type cooperative voltage controller (CVC) operates to avoid a sudden change of the voltage at the own terminal.

The normal voltage control operation of the transformer-type cooperative voltage controller (CVC) 7 is described next. The transformer-type cooperative voltage controller (CVC) 7 monitors a voltage measurement value at its own terminal in a short cycle (for example, in a cycle of one second), compares the voltage measurement value with the target-voltage-value upper/lower limits to determine if there is a deviation of the voltage measurement value. If the deviation continues, the transformer-type cooperative voltage controller (CVC) 7 adds or subtracts a deviation amount to or from a control amount, and if there is no deviation, resets the deviation amount. If the deviation amount exceeds a preset threshold, the transformer-type cooperative voltage controller (CVC) 7 issues a command to change the tap position so as to adjust the voltage within the target-voltage upper/lower limits. The threshold of a voltage integration value for determining the deviation amount can be set larger than that of the reactive-power-adjusting-type cooperative voltage controller (CVC), in order to reduce the number of tap operations. Such control is executed by the voltage adjusting unit 52 (FIG. 5).

It is assumed that initial values of the target-voltage upper/lower limits of the transformer-type cooperative voltage controller (CVC) 7 (when a target-voltage change request has not been received) are values obtained by, for example, adding or subtracting a certain dead zone (for example, 1% of a set value) to or from a preset value or a value set according to the day of the week, a time zone, or the like. Accordingly, the voltage is maintained on the load side in a normal state where the target-voltage change request has not been issued.

An operation for ensuring the available capacity to generate reactive power of the reactive-power-adjusting-type cooperative voltage control devices PCS 11, PCS 19, and SVC 22 according to the voltage cooperative control by the transformer-type cooperative voltage controller (CVC) 7 and the reactive-power-adjusting-type cooperative voltage controllers (CVC) 12, 19, and 23 is described next.

The reactive-power-adjusting-type cooperative voltage controllers (CVC) 12, 19, and 23 periodically calculate the reactive power generation data (the reactive-power integration value $\Sigma Q$ obtained by integrating the reactive power Q generated by the reactive-power control device, for example, for the preset time T, and the positive-maximum reactive-power integration value $\Sigma Q_{pmax}$ and the negative-maximum reactive-power integration value $\Sigma Q_{nmax}$ obtained by integrating the positive maximum reactive power $Q_{pmax}$ and the negative maximum reactive power $Q_{nmax}$ that can be generated for the preset time T), respectively at regular intervals of the certain time T. The process is performed by the reactive-power generation-data calculation unit 61c (FIG. 3).

The reactive-power-adjusting-type cooperative voltage controllers (CVC) 12, 19, and 23 respectively transmit the reactive power generation data together with the network address of the own device to the transformer-type cooperative voltage controller (CVC) 7 at regular intervals of the certain time T. The process is performed by the communication processing unit 64 (FIG. 3).

Figure 6:
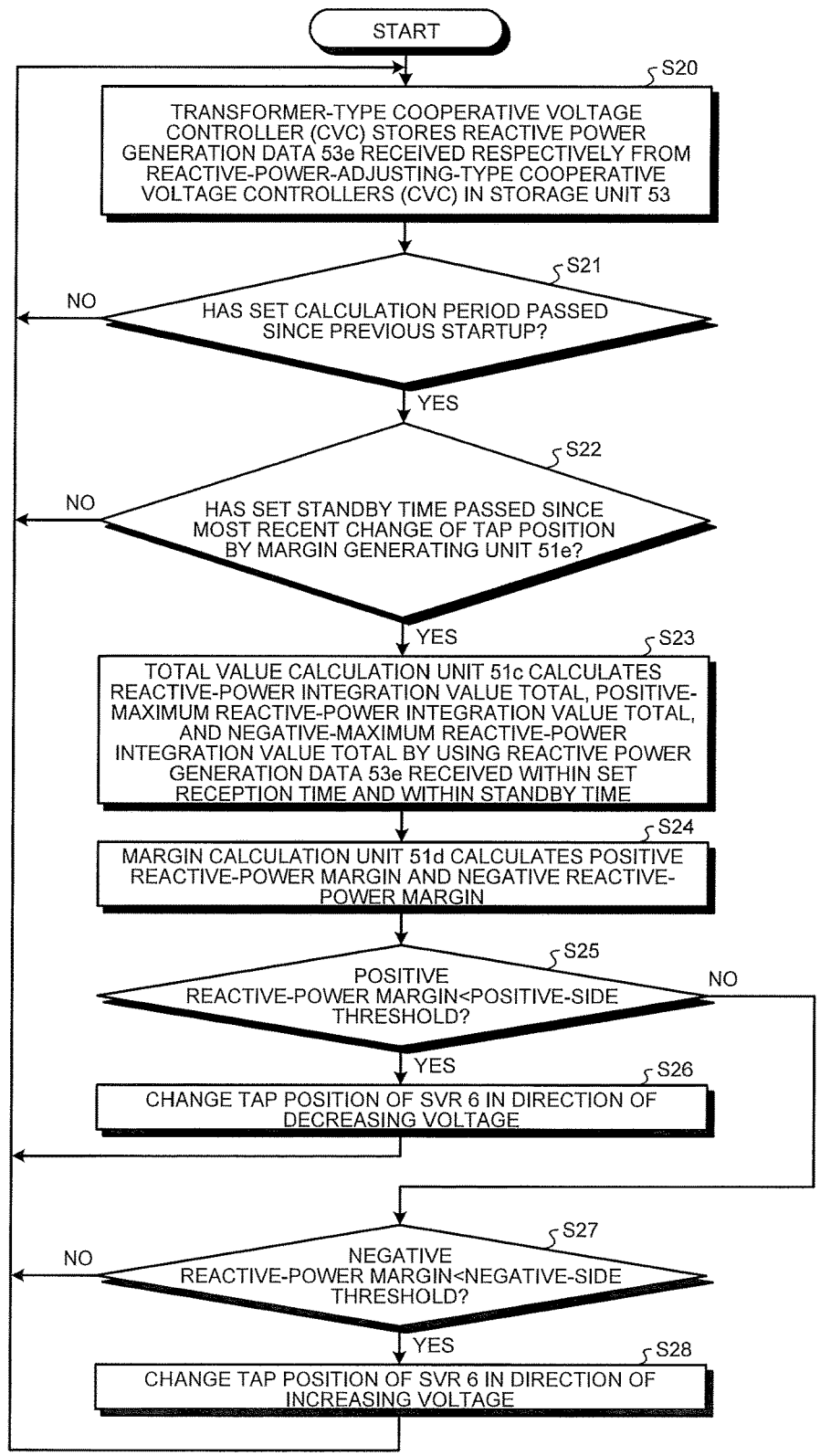
FIG. 6 is a flowchart illustrating an operation of a transformer-type cooperative voltage controller (CVC) that periodically processes reactive power generation data.

FIG. 6 is a flowchart illustrating an operation of the transformer-type cooperative voltage controller (CVC) that periodically processes reactive power generation data. The transformer-type cooperative voltage controller (CVC) stores the reactive power generation data 53e received respectively from the reactive-power-adjusting-type cooperative voltage controller (CVC) via the communication processing unit 54 in the storage unit 53 (S20). In the case of the transformer-type cooperative voltage controller (CVC) 7, the transformer-type cooperative voltage controller (CVC) 7 receives the reactive power generation data 53e from the reactive-power-adjusting-type cooperative voltage controllers (CVC) 12, 19, and 23.

The transformer-type cooperative voltage controller (CVC) checks whether a predetermined calculation period has passed since previous startup (S21). If the predetermined calculation period has not passed, the control process returns to S20. If the predetermined calculation period has passed, the transformer-type cooperative voltage controller (CVC) checks whether a preset standby time (for example, from about 7/10 to 1 of the certain time T) has passed since the most recent change of the tap position by the margin generating unit 51e (S22). If the preset standby time has not passed, the control process returns to S20. If the preset standby time has passed, the total value calculation unit 51c calculates the total reactive-power integration value that is a total of the reactive power integration values, the total positive-maximum reactive-power integration value that is a total of the positive-maximum reactive-power integration values, and the total negative-maximum reactive-power integration value that is a total of the negative-maximum reactive-power integration values by using the reactive power integration values, the positive-maximum reactive-power integration values, and the negative-maximum reactive-power integration values in the reactive power generation data 53e received within the preset reception time (for example, the certain time T) and within the preset standby time (S23). If there are pieces of data having the network address of the same source in the reactive power generation data 53e, only the latest data is used to obtain the total. The preset reception time can be set longer than the certain time T, taking transmission delay into consideration.

The margin calculation unit 51d calculates the positive reactive-power margin on the basis of the positive-maximum reactive-power integration value total and the reactive-power integration value total, and calculates the negative reactive-power margin on the basis of the negative-maximum reactive-power integration value total and the reactive-power integration value total (S24).

The margin generating unit 51e checks whether the positive reactive-power margin is smaller than the positive-side threshold (S25). If the positive reactive-power margin is smaller than the positive-side threshold, the margin generating unit 51e changes the tap position of the SVR 6 in a direction of decreasing the voltage so that the positive reactive-power margin becomes larger than the positive-side threshold (S26). Specifically, the margin generating unit 51e changes the range of the target-voltage upper/lower limits 53c to a lower side such that the current voltage becomes higher than the target-voltage upper limit, so that the voltage adjusting unit 62 changes the tap position of the SVR 6 to the direction of decreasing the voltage. If the positive reactive-power margin is equal to or larger than the positive-side threshold, the margin generating unit 51e checks whether the negative reactive-power margin is smaller than the negative-side threshold (S27). If the negative reactive-power margin is equal to or larger than the negative-side threshold, the control process returns to S20. If the negative reactive-power margin is smaller than the negative-side threshold, the margin generating unit 51e changes the tap position of the SVR 6 in a direction of increasing the voltage such that the negative reactive-power margin becomes larger than the negative-side threshold (S28). Specifically, the margin generating unit 51e changes the range of the target-voltage upper/lower limits 53c to a higher side so that the current voltage becomes lower than the target-voltage lower limit, so that the voltage adjusting unit 62 changes the tap position of the SVR 6 to the direction of increasing the voltage.

In the SVR that can change the tap position without passing through the voltage adjusting unit, the tap position can be changed without passing through the voltage adjusting unit. When the tap position is to be changed without passing through the voltage adjusting unit, it is checked whether the voltage deviates from the range of the target-voltage upper/lower limits due to the change of the tap position. If a deviation is anticipated, the target-voltage upper/lower limits are changed by a voltage variation range, for example, for one tap so that the voltage adjusting unit does not return the tap position due to the deviation. The target-voltage upper/lower limits can be changed so that the voltage anticipated after the change of the tap position comes to the center.

The reason it is set such that the tap position is not changed since the change of the tap position by the margin generating unit 51e until the preset standby time has passed is because the margin generating unit 51e calculates the positive reactive-power margin and the negative reactive-power margin after the effect of the change of the tap position is reflected in the reactive power generation data.

Furthermore, it can be set such that the tap position is not changed until the ratio of the number of pieces of reactive power generation data received after the margin generating unit 51e has changed the tap position to the number of pieces of reactive power generation data received within the reception time (the past certain time T) becomes larger than a predetermined post-change ratio threshold. In this case, even before the standby time has passed, if pieces of reactive power generation data not less than a certain ratio have been received, the positive reactive-power margin and the negative reactive-power margin can be calculated by using the reactive power generation data received after the change of the tap position. Even if a part of the data cannot be received due to communication failure or the like, control for ensuring the available capacity to generate reactive power can be executed.

An operation of issuing the target-voltage change request in the cooperative voltage sensor (CVS) or the cooperative voltage controller (CVC) is described next. A voltage monitoring function of the cooperative voltage sensor (CVS) or the cooperative voltage controller (CVC) is described first.

Figure 7:
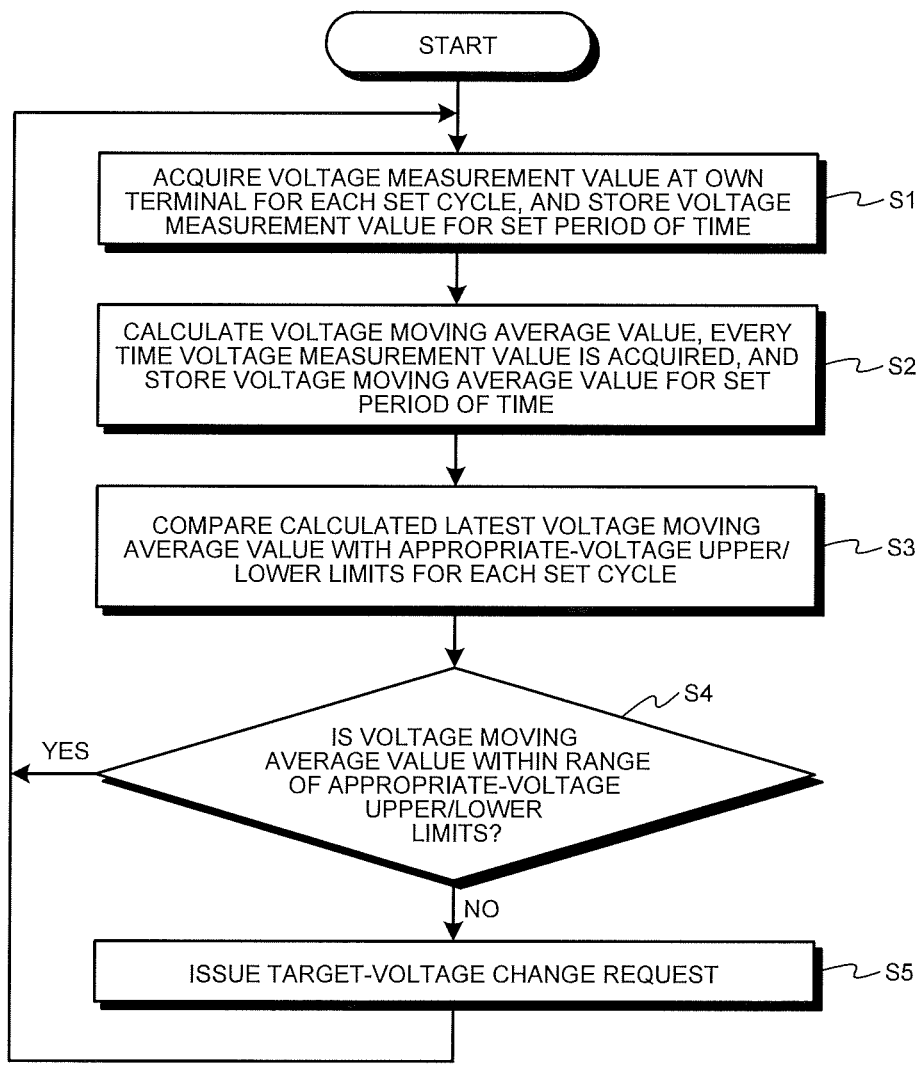
FIG. 7 is a flowchart illustrating a process of issuing a target-voltage change request.

FIG. 7 is a flowchart illustrating a process of issuing a target-voltage change request. The cooperative voltage sensor (CVS) or the reactive-power-adjusting-type cooperative voltage controller (CVC) acquires a voltage measurement value at its own terminal for each preset cycle (for example, in a cycle of one second), and stores the voltage measurement value for the predetermined period of time (for example, for one minute) (S1). For example, in the cooperative voltage sensor (CVS) 8, the voltage monitoring unit 41 acquires a voltage measurement value at its own terminal for each preset cycle, and the voltage measurement value is stored in the storage unit 43 for the predetermined period of time. For example, in the cooperative voltage controller (CVC) 12, the voltage monitoring unit 60 acquires a voltage measurement value at the own terminal for each preset cycle, and the voltage measurement value is stored in the storage unit 63 for the predetermined period of time.

The cooperative voltage sensor (CVS) or the reactive-power-adjusting-type cooperative voltage controller (CVC) calculates, for example, the voltage moving average value (for example, the voltage moving average value for the most recent past one minute), every time the voltage measurement value is acquired (for example, in a cycle of one second), and stores the voltage moving average value for a predetermined period of time (for example, for one minute) (S2). For example, in the cooperative voltage sensor (CVS) 8, the target-voltage change-request-information generating unit 42a calculates the voltage moving average value 43b, and stores the voltage moving average value 43b in the storage unit 43 for a predetermined period of time. For example, in the cooperative voltage controller (CVC) 12, the target-voltage change-request-information generating unit 61a calculates the voltage moving average value 63b, and stores the voltage moving average value 63b in the storage unit 63 for a predetermined period of time.

The cooperative voltage sensor (CVS) or the reactive-power-adjusting-type cooperative voltage controller (CVC) holds the appropriate-voltage upper/lower limits (the appropriate voltage upper limit and the appropriate voltage lower limit), to compare, for example, the calculated latest voltage moving average value with the appropriate-voltage upper/lower limits for each preset cycle (for example, in a cycle of one minute) (S3). If the voltage moving average value deviates from the range of the appropriate-voltage upper/lower limits (NO at S4), the cooperative voltage sensor (CVS) or the reactive-power-adjusting-type cooperative voltage controller (CVC) issues a target-voltage change request (S5). For example, in the cooperative voltage sensor (CVS) 8, the target-voltage change-request-information generating unit 42a performs the comparison process described above, and if the voltage moving average value 43b is not within the range of the appropriate-voltage upper/lower limits 43a, generates the target-voltage change-request information. For example, in the cooperative voltage controller (CVC) 12, the target-voltage change-request-information generating unit 61a performs the comparison process described above, and if the voltage moving average value 63b is not within the range of the appropriate-voltage upper/lower limits 63a, generates the target-voltage change-request information. The target-voltage change-request information includes information of a voltage change amount and a voltage change direction (a voltage increasing direction or a voltage decreasing direction). For example, if the voltage moving average value deviates from the appropriate voltage upper limit, the voltage change direction is a direction of decreasing the voltage. The voltage change amount can be provided in a percentage normalized by the reference voltage, taking into consideration communication between devices having a different voltage level, and for example, about "deviation amount %+0.5%" is set. In this case, the voltage change amount is substantially set as the ratio of the deviation amount to the latest voltage moving average value. The reason the voltage moving average value is used for, for example, determining a deviation of the voltage measurement value is to avoid that an unnecessary target-voltage change request is issued, when the voltage temporarily deviates from the appropriate voltage range due to a whisker-like voltage change within a matter of seconds.

An operation of the cooperative voltage controller (CVC) having received a target-voltage change request is described next. The cooperative voltage controller (CVC) itself having issued a target-voltage change request performs a similar operation as that of the cooperative voltage controller (CVC) having received the target-voltage change request.

Figure 8:
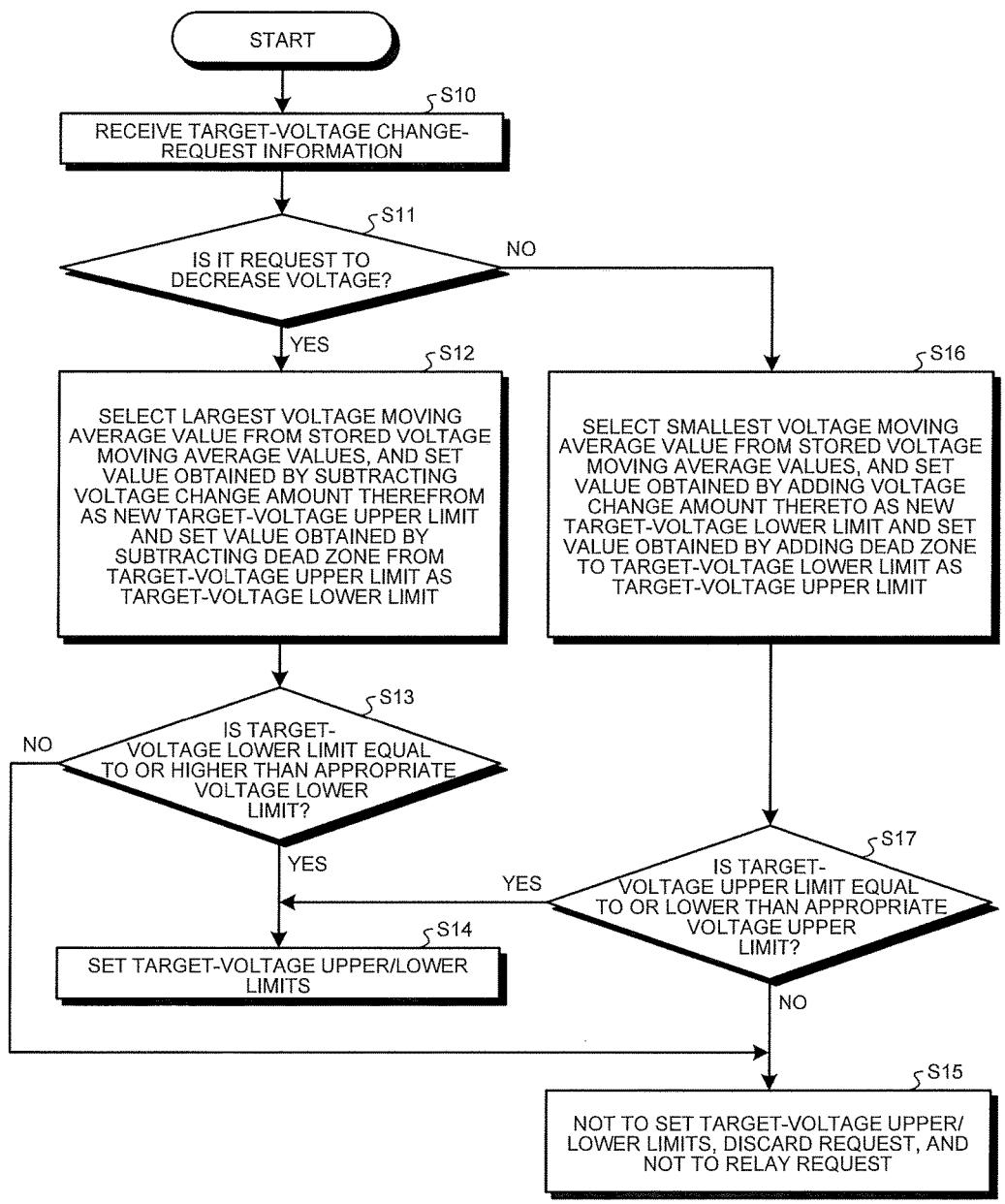
FIG. 8 is a flowchart illustrating a process of changing target-voltage upper/lower limits of a cooperative voltage controller (CVC) having received a target-voltage change request.

A common operation to the reactive-power-adjusting-type and the transformer-type cooperative voltage controllers (CVC) is described first. FIG. 8 is a flowchart illustrating a process of changing target-voltage upper/lower limits of the cooperative voltage controller (CVC) having received the target-voltage change request.

The cooperative voltage controller (CVC) first receives target-voltage change-request information from the cooperative voltage sensor (CVS) or another cooperative voltage controller (CVC) (S10).

The cooperative voltage controller (CVC) discriminates whether the contents of the target-voltage change-request information indicates to decrease the voltage or increase the voltage (S11). For example, upon reception of a request to decrease the voltage (YES at S11), the cooperative voltage controller (CVC) selects the largest voltage moving average value from a plurality of voltage moving average values stored at that point in time, including the latest voltage moving average value, and sets a value obtained by subtracting a voltage change amount therefrom as a new target-voltage upper limit (S12). At this time, for example, in order to maintain a constant range in the target-voltage upper/lower limits, the target-voltage lower limit is set to a value obtained by subtracting the dead zone from the target-voltage upper limit (S12). However, if the target-voltage lower limit set in this manner falls below the appropriate voltage lower limit of the cooperative voltage controller (CVC) (NO at S13), the cooperative voltage controller (CVC) does not set the target-voltage upper/lower limits, discards the request, and does not relay the request (S15). If the target-voltage lower limit set in this manner is equal to or higher than the appropriate voltage lower limit (YES at S13), the cooperative voltage controller (CVC) sets the target-voltage upper/lower limits (S14).

Upon reception of a request to increase the voltage (NO at S11), the cooperative voltage controller (CVC) selects the smallest voltage moving average value from a plurality of voltage moving average values stored at that point in time, including the latest voltage moving average value, and sets a value obtained by adding a voltage change amount thereto as a new target-voltage lower limit (S16). At this time, for example, in order to maintain a constant range in the target-voltage upper/lower limits, the target-voltage upper limit is set to a value obtained by adding the dead zone to the target-voltage lower limit (S16). However, if the target-voltage upper limit set in this manner exceeds the appropriate voltage upper limit of the cooperative voltage controller (CVC) (NO at S17), the cooperative voltage controller (CVC) does not set the target-voltage upper/lower limits, discards the request, and does not relay the request (S15). That is, the target-voltage upper/lower limits after the change need to be within the appropriate voltage range. If the target-voltage upper limit set in this manner falls below the appropriate voltage upper limit (YES at S17), the cooperative voltage controller (CVC) sets the target-voltage upper/lower limits (S14).

The cooperative voltage controller (CVC) having received the target-voltage change request changes the target-voltage upper/lower limits, and fixes the target-voltage upper/lower limits within a preset voltage cooperative-control valid time (for example, one hour), but after the voltage cooperative-control valid time has passed, returns the target-voltage upper/lower limits to the initial values.

If a new target-voltage change request is issued, the cooperative voltage controller (CVC) changes the target-voltage upper/lower limits with a later priority even within the voltage cooperative-control valid time, and further counts the voltage cooperative-control valid time from the time point of change. However, to avoid congestion of the voltage cooperative operation, an overlapped operation prohibition time is set for each device that executes the voltage cooperative control. That is, the cooperative voltage sensor (CVS) does not issue (transmit) a new target-voltage change request until the overlapped operation prohibition time (for example, 10 seconds) has passed after issuance of the target-voltage change request. The reactive-power-adjusting-type cooperative voltage controller (CVC) does not issue (transmit) a new target-voltage change request until the overlapped operation prohibition time (for example, 1 minute) has passed after issuance (transmission) of the target-voltage change request. The reactive-power-adjusting-type cooperative voltage controller (CVC) does not receive a new target-voltage change request until the overlapped operation prohibition time (for example, 1 minute) has passed after reception of the target-voltage change request. The transformer-type cooperative voltage controller (CVC) does not receive a new target-voltage change request until the overlapped operation prohibition time (for example, 30 minutes) has passed after reception of the target-voltage change request. Note that the overlapped operation prohibition time is shorter than the voltage cooperative-control valid time.

Figure 9:
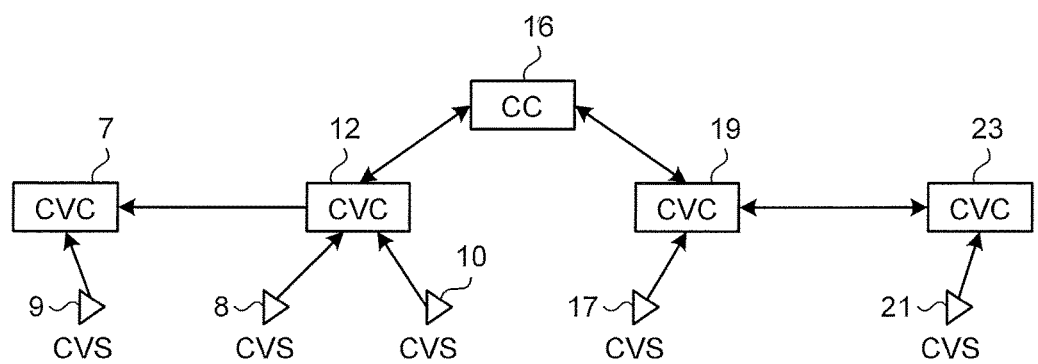
FIG. 9 is a diagram illustrating an example of a communication path (a logical network) between cooperative voltage sensors (CVS) and cooperative voltage controllers (CVC).

Transmission of the target-voltage change-request information is described next. The target-voltage change-request information is transmitted, for example, between devices by a relay method. FIG. 9 is a diagram illustrating an example of a communication path (a logical network) between the cooperative voltage sensor (CVS) and the cooperative voltage controller (CVC). In FIG. 9, arrows represent a transmittable direction of target-voltage change-request information. A relay range of the target-voltage change-request information is set to be within the same power distribution line. As can be understood from a comparison between FIG. 9 and FIG. 1, this logical network has a network configuration corresponding to an electrical connection configuration of a cooperative voltage sensor (CVS) group, a cooperative voltage controller (CVC) group, the connection controller (CC) 16, and a power distribution line group in the power distribution system illustrated in FIG. 1. That is, the arrangement configuration of the cooperative voltage sensor (CVS) group, the cooperative voltage controller (CVC) group, and the connection controller (CC) 16 corresponds to the connection relation among these in the power distribution system.

The cooperative voltage sensor (CVS) does not receive target-voltage change-request information from other devices, and when the cooperative voltage sensor (CVS) itself has issued a target-voltage change request, the cooperative voltage sensor (CVS) transmits the target-voltage change-request information to predetermined one or a plurality of cooperative voltage controllers (CVC). For example, the cooperative voltage sensor (CVS) 21 transmits the target-voltage change-request information to the cooperative voltage controller (CVC) 23. When having received target-voltage change-request information from other devices, the cooperative voltage controller (CVC) can transmit the target-voltage change-request information to predetermined one or a plurality of other cooperative voltage controllers (CVC). However, the cooperative voltage controller (CVC) does not transmit the target-voltage change-request information to the transmission source. For example, when having received target-voltage change-request information from the cooperative voltage sensor (CVS) 21, the cooperative voltage controller (CVC) 23 transmits the target-voltage change-request information to the cooperative voltage controller (CVC) 19. When the cooperative voltage controller (CVC) itself has issued a target-voltage change request, the cooperative voltage controller (CVC) transmits the target-voltage change-request information to predetermined one or a plurality of other cooperative voltage controllers (CVC). For example, when the cooperative voltage controller (CVC) 19 itself has issued a target-voltage change request, the cooperative voltage controller (CVC) 19 transmits the target-voltage change-request information to the cooperative voltage controller (CVC) 23 and also to the cooperative voltage controller (CVC) 12 via the connection controller (CC) 16.

Figure 10:
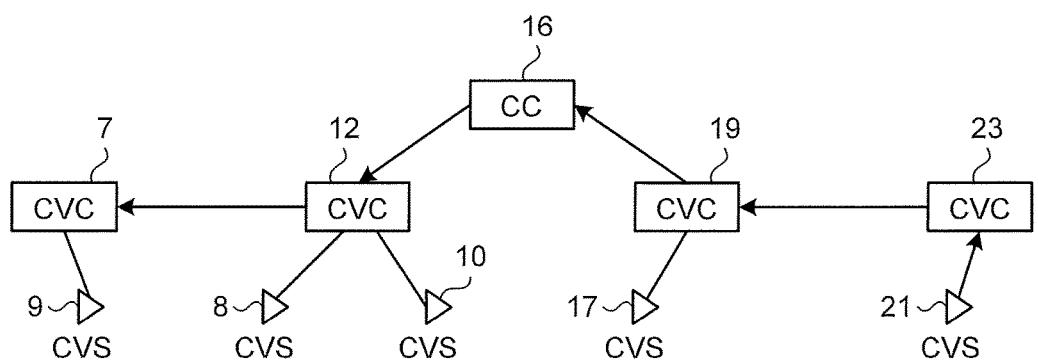
FIG. 10 is a diagram illustrating an example of communication by a relay method between cooperative voltage sensors (CVS) and cooperative voltage controllers (CVC).

FIG. 10 is a diagram illustrating an example of communication by a relay method between the cooperative voltage sensor (CVS) and the cooperative voltage controller (CVC). In FIG. 10, for example, a case in which the cooperative voltage sensor (CVS) 21 has issued a target-voltage change request. The cooperative voltage sensor (CVS) 21 generates target-voltage change-request information, and transmits the target-voltage change-request information to the cooperative voltage controller (CVC) 23. The cooperative voltage controller (CVC) 23 transmits the received target-voltage change-request information to the cooperative voltage controller (CVC) 19. The cooperative voltage controller (CVC) 19 transmits the received target-voltage change-request information to the connection controller (CC) 16. The connection controller (CC) 16 transmits the received target-voltage change-request information to the cooperative voltage controller (CVC) 12. That is, the cooperative voltage controller (CVC) 19 transmits the received target-voltage change-request information to the cooperative voltage controller (CVC) 12 via the connection controller (CC) 16. Further, the cooperative voltage controller (CVC) 12 transmits the received target-voltage change-request information to the cooperative voltage controller (CVC) 7. In this manner, the target-voltage change request issued by the cooperative voltage sensor (CVS) 21 is sequentially delivered by the cooperative voltage controllers (CVC) and the connection controller (CC) 16 by the relay method, and respectively notified and circulated to the cooperative voltage controllers (CVC) 7, 12, 19, and 23.

The cooperative voltage sensor (CVS), the cooperative voltage controller (CVC), and the connection controller (CC) 16 respectively hold a destination network address of the target-voltage change request. Setting of the network address is performed so that the relay range of the target-voltage change request is within the same power distribution line. For example, the cooperative voltage sensor (CVS) 21 holds a network address of the cooperative voltage controller (CVC) 23 as a destination. For example, the cooperative voltage controller (CVC) 19 holds respective network addresses of the cooperative voltage controller (CVC) 23 and the connection controller (CC) 16 as destinations. When issuing a target-voltage change request by itself or having received a target-voltage change request from the cooperative voltage sensor (CVS) 17, the cooperative voltage controller (CVC) 19 sends the target-voltage change request by setting the network addresses of the cooperative voltage controller (CVC) 23 and the connection controller (CC) 16 as the destinations. When having received a target-voltage change request from the cooperative voltage controller (CVC) 23 or the connection controller (CC) 16, the cooperative voltage controller (CVC) 19 sends the target-voltage change request by setting the network address of a control device other than the source of the received target-voltage change request as the destination.

As illustrated in FIG. 9, the logical network is configured based on electrical connection, that is, for one power distribution line directly linked with voltage fluctuations. However, if the electrical connection may be changed due to a change of the switching state of a switch or a breaker, the connection controller (CC) 16 is installed in order to reflect the electrical connection change in the relay range of the target-voltage change request. When the switch or the breaker is closed, the connection controller (CC) 16 relays the target-voltage change request. When the switch or the breaker is open, the connection controller (CC) 16 discards the target-voltage change request. For example, in a configuration in which a high-voltage power distribution line different from the power distribution line 2 is connected to the power distribution transformer 1 in FIG. 1, a system portion rather on the load side than the switch 15 on the power distribution line 2 may be connected to a system portion on a power supply side of the different high-voltage power distribution line by opening the switch 15 on the power distribution line 2. In such a case, by reflecting the change of the electrical connection on the communication path by the connection controller (CC) 16, the connection of the power distribution system is appropriately reflected on the relay range of the target-voltage change request, and thus voltage cooperative control becomes effective.

The transformer-type cooperative voltage controller (CVC) 7 executes transmission control so as not to relay the target-voltage change request.

In FIG. 9, an arrow directed from the cooperative voltage controller (CVC) 7 to the cooperative voltage controller (CVC) 8 is not illustrated. This means that the transformer-type cooperative voltage controller (CVC) 7 itself does not issue a target-voltage change request, as described above, and even if having received a target-voltage change-request information from the cooperative voltage sensor (CVS) 9, the transformer-type cooperative voltage controller (CVC) 7 does not relay the target-voltage change-request information to the cooperative voltage controller (CVC) 12.

Regular transmission of the reactive power generation data (the reactive-power integration value $\Sigma Q$, the positive-maximum reactive-power integration value $\Sigma Q_{pmax}$, and the negative-maximum reactive-power integration value $\Sigma Q_{nmax}$ and the network address from the reactive-power-adjusting-type cooperative voltage controllers (CVC) 12, 19, and 23 to the transformer-type cooperative voltage controller (CVC) 7 follows the same route as the target-voltage change request, and is performed by the relay method (see FIG. 9 and FIG. 10).

Figure 11:
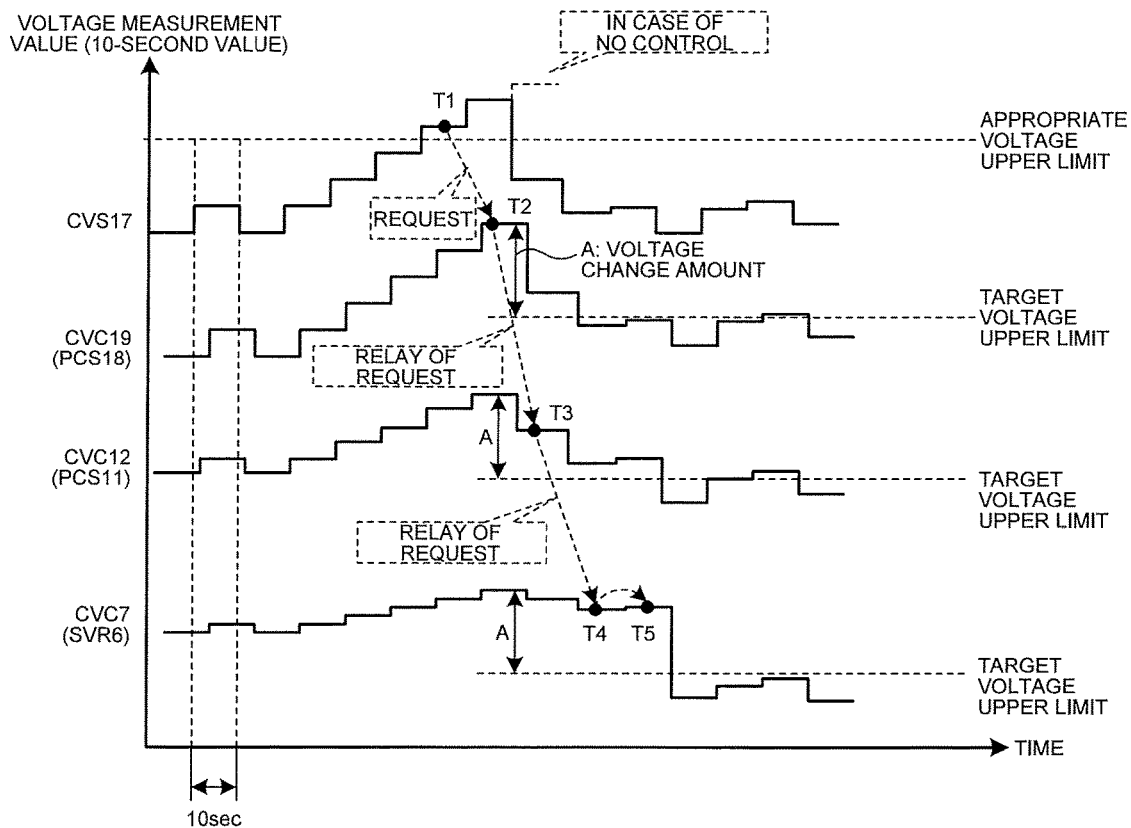
FIG. 11 is a schematic diagram illustrating an operation example in which a voltage deviation occurring in the power-distribution-system voltage control system according to the embodiment is resolved with a change of a tap position of a transformer-type voltage control device.
Figure 12:
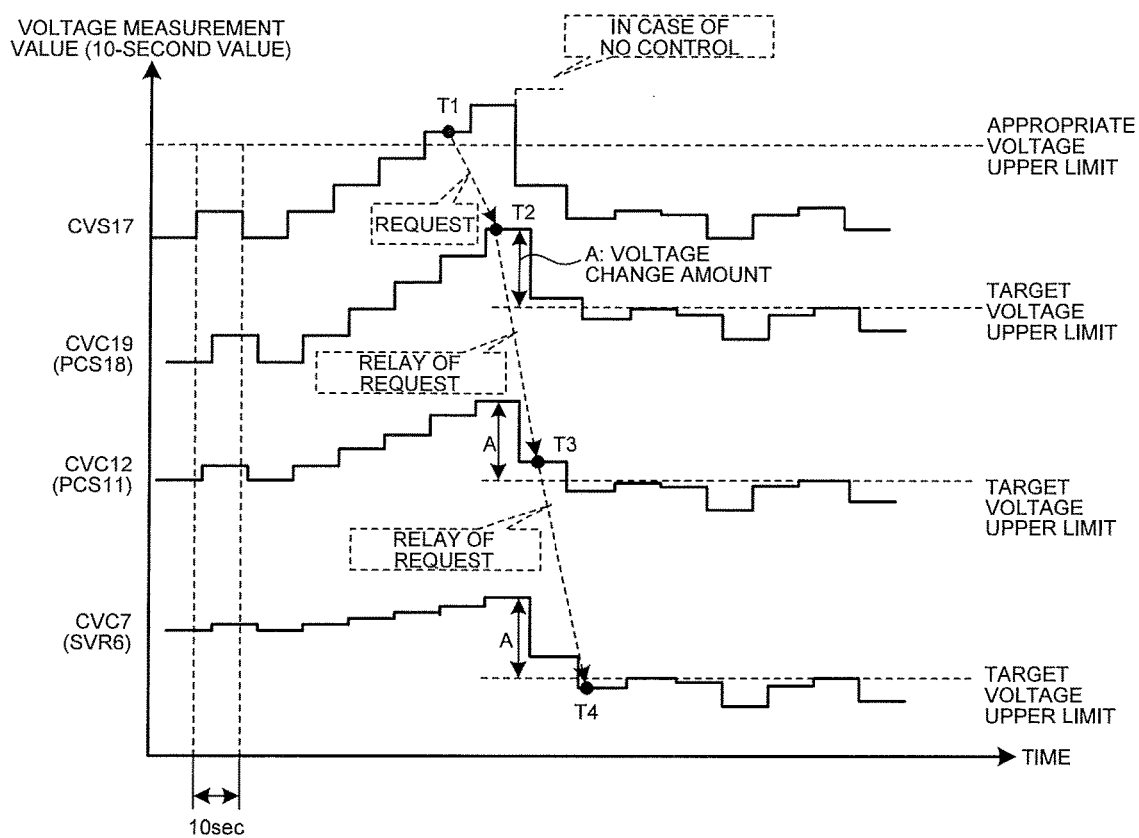
FIG. 12 is a schematic diagram illustrating an operation example in which a voltage deviation is resolved without the change of the tap position of the transformer-type voltage control device.
Figure 13:
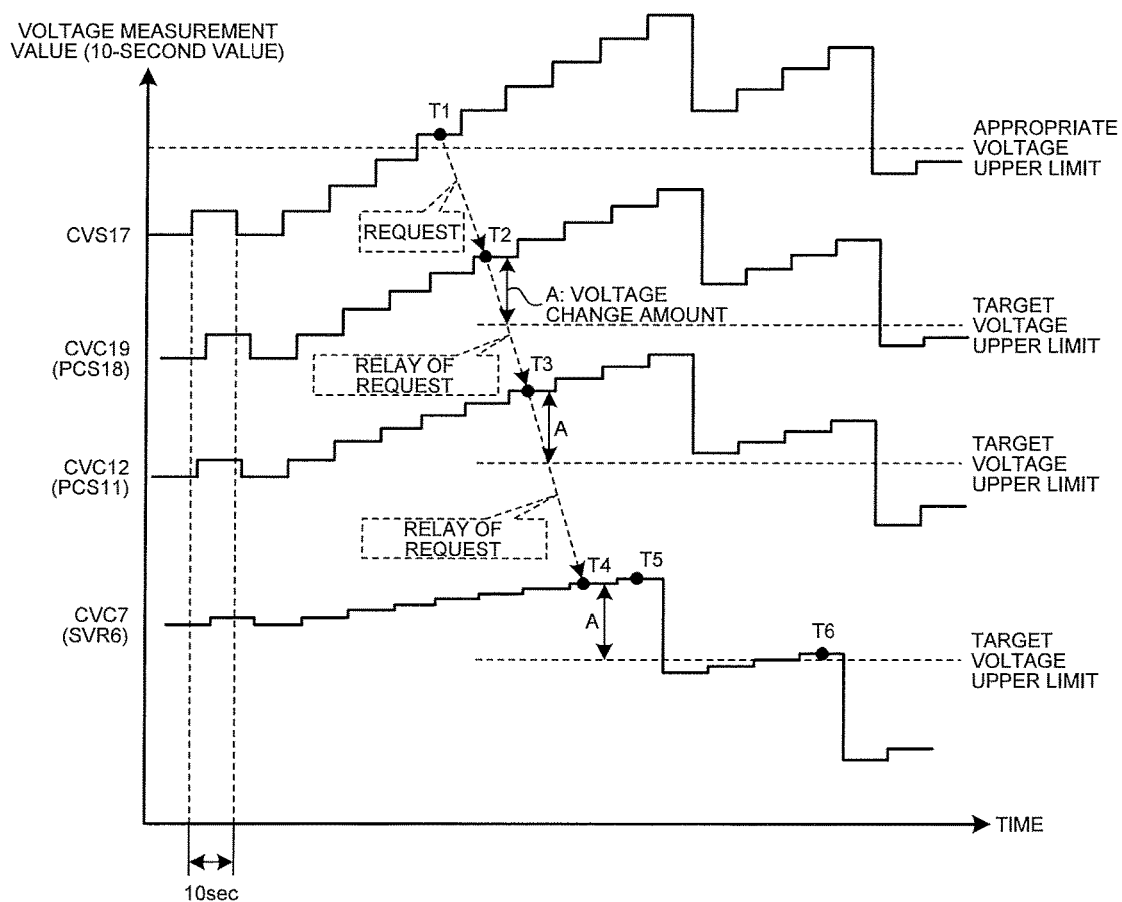
FIG. 13 is a schematic diagram illustrating an example of an operation of the entire power-distribution-system voltage control system in a case in which a reactive-power-adjusting-type cooperative voltage controller (CVC) does not have available capacity to generate reactive power, as a comparative example.

An operation example in which the power-distribution-system voltage control system according to the present embodiment maintains the voltage in an appropriate range is described next. FIG. 11 and FIG. 12 illustrate a case where an available capacity to generate reactive power of a reactive-power-adjusting-type voltage control device is sufficiently ensured. FIG. 11 is a schematic diagram illustrating an operation example in which a voltage deviation that has occurred in the power-distribution-system voltage control system according to the present embodiment is resolved with a change of a tap position of a transformer-type voltage control device. FIG. 12 is a schematic diagram illustrating an operation example in which a voltage deviation is resolved without the change of the tap position of the transformer-type voltage control device. FIG. 13 illustrates a case of resolving a voltage deviation that occurs when an available capacity to generate reactive power of a reactive-power-adjusting-type voltage control device is not sufficiently ensured, as a comparative example.

FIG. 11 is described first. In FIG. 11, respective operations of the CVS 17, the CVC 19 (the PCS 18), the CVC 12 (the PCS 11), and the CVC 7 (the SVR 6) described with reference to FIG. 1 are illustrated, in which a time is plotted on a horizontal axis and a voltage measurement value is plotted on a vertical axis. To simplify the drawing and descriptions, for example, the following conditions are set.

First, a communication time between the devices depends on the performance of the communication network and the number of devices to communicate with each other. However, it is assumed and described here that the communicable time is set as 10 seconds even in the worst case. It is also assumed that the voltage changes every 10 seconds, same as the communication time between the devices. It is also assumed that each device operates based on a voltage mean value of the voltage measurement value 10 seconds, which is updated for every 10 seconds. Synchronization is not established between the devices, and thus an update timing (every 10 seconds) of the voltage measurement value is different for each device. The CVC 19 assumes a state where a target-voltage upper limit can be sufficiently maintained only by the PCS 18. However, the CVC 12 assumes a state where the target-voltage upper limit cannot be sufficiently maintained only by the PCS 11, even if a reactive power output is the largest. Further, such a case is assumed that photovoltaic power generation is increasing during daytime when the weather is fine, and the load-side voltage gradually increases in the high-voltage power-distribution system. Descriptions of the operation of the CVC 23 (the SVC 22) are omitted.

At a time T1, the voltage moving average value exceeds the appropriate voltage upper limit, and the CVS 17 detects a voltage deviation from the range of the appropriate-voltage upper/lower limits. Therefore, the CVS 17 issues a target-voltage change request by a voltage change amount A in the direction of decreasing the voltage. Actually, for example, a voltage mean value in one second is set every second as the voltage measurement value, to determine a voltage deviation according to the voltage moving average value obtained every second from the voltage measurement value for the most recent past one minute. Therefore, the target-voltage change request is issued at the time when the voltage moving average value for one minute exceeds the appropriate voltage upper limit, after the time T1.

The CVC 19 receives the target-voltage change-request information transmitted from the CVS 17, selects the largest value from the voltage moving average value at that point in time (a time T2) and the past voltage moving average values stored therein, and sets a value obtained by subtracting the voltage change amount A from the largest value as a new target-voltage upper limit. The PCS 18 controlled by the CVC 19 has a sufficient available capacity to generate reactive power on the positive side, and operates to decrease the voltage of its own device to be equal to or lower than the new target-voltage upper limit. At the time T2 and thereafter, the voltage measurement value drops and is controlled to be equal to or lower than the target-voltage upper limit. The CVC 19 transmits the target-voltage change-request information to the CVC 12. Because the PCS 18 is a reactive-power-adjusting-type voltage control device, the PCS 18 decreases the voltage of the power distribution system on an upstream side thereof according to impedance from the power distribution transformer. Therefore, at the time T2 and thereafter, the voltage of the CVC 12 and the CVC 7 on the upstream side of the CVC 19 also drops.

The CVC 12 receives the target-voltage change-request information transferred from the CVC 19, selects the largest value from the voltage moving average value at that point in time (a time T3) and the past voltage moving average values stored therein, and sets a value obtained by subtracting the voltage change amount A from the largest value as a new target-voltage upper limit. The PCS 11 controlled by the CVC 12 also has a sufficient available capacity to generate reactive power on the positive side, and operates to decrease the voltage of its own device to be equal to or lower than the new target-voltage upper limit. At the time T3 and thereafter, the voltage measurement value drops and is controlled to be equal to or lower than the target-voltage upper limit. The CVC 12 transmits the target-voltage change-request information to the CVC 7.

The CVC 7 receives the target-voltage change-request information transferred from the CVC 12, selects the largest value from the voltage moving average value at that point in time (a time T4) and the past voltage moving average values stored therein, and sets a value obtained by subtracting the voltage change amount A from the largest value as a new target-voltage upper limit. At the time T4, because the voltage measurement value exceeds the new target-voltage upper limit, the CVC 7 changes the tap position of the SVR 6 so as to decrease the voltage. It is assumed that the SVR 6 requires 10 seconds from the time at which the CVC 7 has received the target-voltage change-request information (the time T4) until completion of the change of the tap position (a time T5). At the time T5 when the change of the tap position is complete and thereafter, the voltage measurement value drops, and is controlled to be equal to or lower than the target-voltage upper limit.

In FIG. 11, upon reception of a target-voltage change request, the CVC 7 decreases its own target-voltage upper limit and executes control to change the tap position of the SVR 6. Therefore, after the change of the tap position, the reactive-power generation amount required for maintaining the voltage to be equal to or lower than the target-voltage upper limit decreases in the PCS 11, the PCS 18, and the like. Accordingly, the available capacity to generate reactive power of the PCS 11, the PCS 18, and the like can be ensured.

FIG. 12 is described next. In FIG. 12, respective operations of the CVS 17, the CVC 19 (the PCS 18), the CVC 12 (the PCS 11), and the CVC 7 (the SVR 6) described with reference to FIG. 1 are illustrated similarly to FIG. 11, in which a time is plotted on a horizontal axis and a voltage measurement value is plotted on a vertical axis. The conditions are substantially the same as in FIG. 11. Only different conditions are described here. The distance between the power distribution transformer 1 and the SVR 6 is large, and because the CVC 19 and the CVC 12 control the reactive power, the voltage at an installation site of the SVR 6 drops to be equal to or lower than the target-voltage upper limit. That is, a state where, even if the tap position of the SVR 6 is not changed, the SVR 6 can meet a target-voltage upper limit constraint can be assumed.

At the time T1, the voltage moving average value exceeds the appropriate voltage upper limit, and the CVS 17 detects a voltage deviation from the range of the appropriate-voltage upper/lower limits. Therefore, the CVS 17 issues a target-voltage change request by the voltage change amount A in a direction of decreasing the voltage.

The CVC 19 receives the target-voltage change-request information transmitted from the CVS 17, selects the largest value from the voltage moving average value at that point in time (the time T2) and the past voltage moving average values stored therein, and sets a value obtained by subtracting the voltage change amount A from the largest value as a new target-voltage upper limit. The PCS 18 controlled by the CVC 19 has a sufficient available capacity to generate reactive power on the positive side, and operates to decrease the voltage of the own device to be equal to or lower than the new target-voltage upper limit. At the time T2 and thereafter, the voltage measurement value drops and is controlled to be equal to or lower than the target-voltage upper limit. The CVC 19 transmits the target-voltage change-request information to the CVC 12.

The CVC 12 receives the target-voltage change-request information transferred from the CVS 19, selects the largest value from the voltage moving average value at that point in time (the time T3) and the past voltage moving average values stored therein, and sets a value obtained by subtracting the voltage change amount A from the largest value as a new target-voltage upper limit. The PCS 11 controlled by the CVC 12 also has a sufficient available capacity to generate reactive power on the positive side, and operates to decrease the voltage of the own device to be equal to or lower than the new target-voltage upper limit. At the time T3 and thereafter, the voltage measurement value drops and is controlled to be equal to or lower than the target-voltage upper limit. The CVC 12 transmits the target-voltage change-request information to the CVC 7.

The CVC 7 receives the target-voltage change-request information transferred from the CVS 12, selects the largest value from the voltage moving average value at that point in time (the time T4) and the past voltage moving average values stored therein, and sets a value obtained by subtracting the voltage change amount A from the largest value as a new target-voltage upper limit. At the time T4, however, because it is controlled such that the reactive power generated by the PCS 11, the PCS 18, and the like increases, the voltage measurement value falls below the new target-voltage upper limit. Therefore, the SVR 6 does not violate the target-voltage upper limit constraint, and thus the tap position of the SVR 6 is not changed. In this case, the PCS 11, the PCS 18, and the like continuously generate reactive power required for the voltage to become equal to or lower than the target-voltage upper limit. Therefore, the available capacity to generate reactive power of the reactive-power-adjusting-type voltage control device such as the PCS 11, the PCS 18, and the like may not be ensured. As a result, the PCS 11, the PCS 18, and the like may be in a state that the available capacity to withstand voltage fluctuations at a high speed is lost, until the voltage cooperative-control valid time (for example, one hour) has passed.

When the available capacity to generate reactive power of the reactive-power-adjusting-type voltage control device is not sufficient, even if a voltage deviation occurs, time required for resolving the deviation becomes long. FIG. 13 illustrating a case in which an available capacity to generate reactive power is not sufficient is described. The conditions are the same as in FIG. 12; however, a different point is that the PCS 11, the PCS 18, and the like continuously generate reactive power required for the voltage to become equal to or lower than a target-voltage upper limit, and cannot decrease the voltage with respect to a new voltage rise.

At the time T1, the voltage moving average value exceeds the appropriate voltage upper limit, and the CVS 17 detects a voltage deviation from the range of the appropriate-voltage upper/lower limits. Therefore, the CVS 17 issues a target-voltage change request in a direction of decreasing the voltage.

The CVC 19 receives the target-voltage change-request information transmitted from the CVS 17, selects the largest value from the voltage moving average value at that point in time (the time T2) and the past voltage moving average values stored therein, and sets a value obtained by subtracting the voltage change amount A from the largest value as a new target-voltage upper limit. The PCS 18 controlled by the CVC 19 does not have a sufficient available capacity to generate reactive power on the positive side. Therefore, even if the target-voltage upper limit is changed to be low, the PCS 18 cannot decrease the voltage of its own device. Accordingly, at the time T2 and thereafter, the voltage measurement value increases. The CVC 19 transmits the target-voltage change-request information to the CVC 12.

The CVC 12 receives the target-voltage change-request information transferred from the CVS 19, selects the largest value from the voltage moving average value at that point in time (the time T3) and the past voltage moving average values stored therein, and sets a value obtained by subtracting the voltage change amount A from the largest value as a new target-voltage upper limit. The PCS 11 controlled by the CVC 12 does not have a sufficient available capacity to generate reactive power on the positive side. Therefore, even if the target-voltage upper limit is changed to be low, the PCS 11 cannot decrease the voltage of the own device. Accordingly, at the time T3 and thereafter, the voltage measurement value increases. The CVC 12 transmits the target-voltage change-request information to the CVC 7.

The CVC 7 receives the target-voltage change-request information transferred from the CVS 12, selects the largest value from the voltage moving average value at that point in time (the time T4) and the past voltage moving average values stored therein, and sets a value obtained by subtracting the voltage change amount A from the largest value as a new target-voltage upper limit. At the time T4, because the voltage measurement value exceeds the new target-voltage upper limit, the CVC 7 executes control to change the tap position of the SVR 6 so as to decrease the voltage. At the time T5 when the change of the tap position is complete and thereafter, the voltage measurement value drops, and is controlled to be equal to or lower than the target-voltage upper limit at the location site of the SVR 6. However, although the voltage at installation sites of the CVS 17, the PCS 18, and the PCS 11 drops, the voltage is still larger than the target-voltage upper limit, and thereafter, the voltage rises.

At a time T6, the voltage at the installation site of the SVR 6 exceeds the target-voltage upper limit again. The SVR 6 changes the tap position again to decrease the voltage. The voltage at the installation site of the CVS 17 becomes equal to or lower than the appropriate voltage upper limit. The voltage at the installation sites of the PCS 18 and the PCS 11 becomes equal to or lower than the target-voltage upper limit. The PCS 18 and the PCS 11 recover the available capacity to generate reactive power. When this case is compared with the case illustrated in FIG. 12, time required for the voltage at the installation site of the CVS 17 to become equal to or lower than an appropriate-voltage upper limit has become longer by about 90 seconds. In this manner, if a voltage deviation occurs in a state where the reactive-power-adjusting-type reactive-power generation unit does not have an available capacity to generate reactive power, the time until the voltage deviation is resolved becomes long.

According to the present invention, an available capacity to generate reactive power of a reactive-power-adjusting-type voltage control device is periodically checked. As a result of the check, if it is found that the available capacity to generate reactive power on the positive side or the negative side is small, a tap position of a transformer-type voltage control device is changed such that the available capacity to generate reactive power on the insufficient side increases. Therefore, according to the present invention, the available capacity to generate reactive power of the reactive-power-adjusting-type voltage control device can be ensured.

As described above, according to the present embodiment, the transformer-type voltage controller uses reactive power generation data transmitted from a reactive-power-adjusting-type voltage controller, to calculate a positive reactive-power margin and a negative reactive-power margin. If the positive reactive-power margin is smaller than the positive-side threshold, the tap position of the transformer-type voltage control device is changed so that the positive reactive-power margin becomes larger than the positive-side threshold. If the negative reactive-power margin is smaller than a negative-side threshold, the tap position of the transformer-type voltage control device is changed such that the negative reactive-power margin becomes larger than the negative-side threshold. Therefore, the available capacity to generate reactive power of the reactive-power-adjusting-type voltage control device can be ensured.

Furthermore, according to the present embodiment, at the time of executing cooperative voltage control, transmission and reception of required data are mainly only transfer of target-voltage change-request information between a cooperative voltage controller (CVC) and a cooperative voltage sensor (CVS), and transmission of reactive power generation data (a reactive-power integration value $\Sigma Q$, a positive-maximum reactive-power integration value $\Sigma Q_{pmax}$, and a negative-maximum reactive-power integration value $\Sigma Q_{nmax}$) from the reactive-power-adjusting-type cooperative voltage controller (CVC) to the transformer-type cooperative voltage controller (CVC). Accordingly, the communication load is reduced, and the cost is reduced, without requiring providing a high-speed communication network, a high-speed server, or the like.

According to the present embodiment, a communication path between the cooperative voltage controller (CVC) and the cooperative voltage sensor (CVS) is configured, as illustrated in FIG. 9 and FIG. 10, in a mode corresponding to an electrical connection configuration of a power distribution system, and transmission of target-voltage change-request information and integration value data is sequentially performed between the devices by a relay method. Therefore, the communication load is further reduced, and setting of the communication network is facilitated, even if a new cooperative voltage controller (CVC) or a cooperative voltage sensor (CVS) is added in the power distribution system. Other effects of the present embodiment are similar to those already described above.

In the present embodiment, a case in which a photovoltaic power generation source is connected to a low-voltage system of the power distribution system as a dispersed power system has been described; however, the present embodiment is also applicable to a case in which a dispersed power system other than the photovoltaic power generation source is connected thereto.

In the present embodiment, target-voltage change-request information and integration data are delivered and transmitted and received between the devices by a relay method. However, transmission and reception thereof can be performed without depending on the relay method.

Not only in autonomous and cooperative control but also in centralized control, the present invention can be applied to ensure an available capacity to generate reactive power of a reactive-power-adjusting-type voltage control device, while maintaining an appropriate voltage.

INDUSTRIAL APPLICABILITY

As described above, the present invention is useful as a transformer-type voltage controller, a reactive-power-ad-

REFERENCE SIGNS LIST 1 power distribution transformer, 2, 32-34 power distribution line, 3 breaker, 4, 14 transformer, 5 load, 6 SVR, 7, 12, 19, 23 cooperative voltage controller (CVC), 8, 9, 10, 17, 21 cooperative voltage sensor (CVS), 11, 18 power conditioner (PCS), 15 switch, 16 connection controller (CC), 22 static var compensator (SVC), 29 bus, communication network, 31 network cable, 40 voltage measuring unit, 41, 50, 60 voltage monitoring unit, 42, 61 arithmetic processing unit, 42a, 51a, 61a target-voltage change-request-information generating unit, 43, 53, 63 storage unit, 43a, 53a, 63a appropriate-voltage upper/lower limits, 43b, 53b, 63b voltage moving average value, 43c, 53d, 63d voltage measurement value, 44, 54, 64 communication processing unit, 51 arithmetic processing unit, 51b, 61b target-voltage change processing unit, 51c total value calculation unit, 51d margin calculation unit, 51e margin generating unit, 52, 62 voltage adjusting unit, 53c, 63c target-voltage upper/lower limits, 53e reactive power generation data, 61c reactive-power generation-data calculation unit.

The invention claimed is:

1. A transformer-type voltage controller comprising:
a communication processing unit to receive reactive power generation data, which are transmitted from a plurality of reactive-power-adjusting-type voltage controllers that control reactive-power-adjusting-type voltage control devices to be respectively controlled, the reactive power generation data each including a reactive-power integration value obtained by integrating reactive power generated by the reactive-power-adjusting-type voltage control device for a preset time, and also a positive-maximum reactive-power integration value and a negative-maximum reactive-power integration value, both of which can be generated by the reactive-power-adjusting-type voltage control device, and are obtained respectively by integrating positive maximum reactive power and negative maximum reactive power for a preset time;
a total value calculation unit to calculate a total reactive-power integration value that is a total of the reactive-power integration values, a total positive-maximum reactive-power integration value that is a total of the positive-maximum reactive-power integration values, and a total negative-maximum reactive-power integration value that is a total of the negative-maximum reactive-power integration values, by using the reactive-power integration values, the positive-maximum reactive-power integration values, and the negative-maximum reactive-power integration values in the reactive power generation data respectively received from the plurality of reactive-power-adjusting-type voltage control devices at a preset calculation cycle within a preset reception time;
a margin calculation unit to calculate a positive reactive-power margin according to the total positive-maximum reactive-power integration value and the total reactive-power integration value, and calculate a negative reactive-power margin according to the total negative-maximum reactive-power integration value and the total reactive-power integration value; and
a margin generation unit to change a tap position of a transformer-type voltage control device connected to a high-voltage power distribution line such that if the positive reactive-power margin is smaller than a positive-side threshold, the positive reactive-power margin becomes larger than the positive-side threshold, and change the tap position of the transformer-type voltage control device such that if the negative reactive-power margin is smaller than a negative-side threshold, the negative reactive-power margin becomes larger than the negative-side threshold,
wherein the margin generation unit does not change the tap position until a ratio of a number of pieces of the reactive power generation data received after changing the tap position to a number of pieces of the reactive power generation data received within the reception time becomes larger than a predetermined post-change ratio threshold.

2. The transformer-type voltage controller according to claim 1, wherein the margin generating unit does not change the tap position until a preset standby time passes after a previous changing of the tap position.

3. The transformer-type voltage controller according to claim 1, comprising a voltage adjusting unit to adjust the tap position of the transformer-type voltage control device such that a voltage measurement value measured by the transformer-type voltage control device is maintained within a range of target-voltage upper/lower limits, wherein
the margin generating unit changes the target-voltage upper/lower limits, at the time of changing the tap position of the transformer-type voltage control device, such that the voltage measurement value becomes outside the range of the target-voltage upper/lower limits, and the voltage measurement unit changes the tap position.

4. The transformer-type voltage controller according to claim 1, comprising:
a target-voltage change processing unit to change target-voltage upper/lower limits according to target-voltage change-request information, which is transmitted, when a voltage at an installation site of a voltage controller or a voltage sensor has deviated from an appropriate voltage range, for requesting a voltage controller to change target-voltage upper/lower limits and is received by the communication processing unit; and
a target-voltage change-request-information generating unit to generate the target-voltage change-request information, which is transmitted, when a voltage at an installation site of a transformer-type voltage control device controlled by the transformer-type voltage controller deviates from the appropriate voltage range, from the communication processing unit so as to request a change of target-voltage upper/lower limits with respect to another voltage controller, wherein
the communication processing unit transmits the received target-voltage change-request information further to another voltage controller.

5. A reactive-power-adjusting-type voltage controller that transmits reactive power generation data to a transformer-type voltage controller; wherein the transformer-type voltage controller calculates a total reactive-power integration value that is a total of the reactive-power integration values, a total positive-maximum reactive-power integration value that is a total of the positive-maximum reactive-power integration values, and a total negative-maximum reactive-power integration value that is a total of the negative-maximum reactive-power integration values, by using the reactive-power integration values, the positive-maximum reactive-power integration values, and the negative-maximum reactive-power integration values in the reactive power generation data respectively received from the plurality of reactive-power-adjusting-type voltage control devices at a preset calculation cycle within a preset reception time; calculates a positive reactive-power margin according to the total positive-maximum reactive-power integration value and the total reactive-power integration value, and calculates a negative reactive-power margin according to the total negative-maximum reactive-power integration value and the total reactive-power integration value; and changes a tap position of a transformer-type voltage control device connected to a high-voltage power distribution line such that if the positive reactive-power margin is smaller than a positive-side threshold, the positive reactive-power margin becomes larger than the positive-side threshold, and changes the tap position of the transformer-type voltage control device such that if the negative reactive-power margin is smaller than a negative-side threshold, the negative reactive-power margin becomes larger than the negative-side threshold, wherein the tap position remains unchanged until a ratio of a number of pieces of the reactive power generation data received after the tap position is changed to a number of pieces of the reactive power generation data received within the preset reception time becomes larger than a predetermined post-change ratio threshold, and wherein the reactive-power-adjusting-type voltage controller comprises:

a voltage adjusting unit to control reactive power output by a reactive-power-adjusting type voltage control device such that a voltage measurement value each measured by the reactive-power-adjusting-type voltage control device to be controlled, which is connected to both or either of a high-voltage power distribution line and a low-voltage power distribution line is maintained within a range of target-voltage upper/lower limits;

an arithmetic processing unit to calculate a reactive power integration value by integrating the reactive power generated by the reactive-power-adjusting-type voltage control device for a preset time, and also a positive-maximum reactive-power integration value and a negative-maximum reactive-power integration value by respectively integrating positive maximum reactive power and negative maximum reactive power that can be generated by the reactive-power-adjusting-type voltage control device for the preset time; and a communication processing unit to periodically transmit reactive-power-generation data including the reactive power integration value, the positive-maximum reactive-power integration value and the negative-maximum reactive-power integration value, to the transformer-type voltage controller.

6. The reactive-power-adjusting-type voltage controller according to claim 5, wherein the reactive-power-adjusting-type voltage controller transmits the reactive power integration value, the positive-maximum reactive-power integration value, and the negative-maximum reactive-power integration value to a closest transformer-type voltage controller present on an upstream side.

7. The reactive-power-adjusting-type voltage controller according to claim 5, comprising:

a target-voltage change processing unit to change target-voltage upper/lower limits according to target-voltage change-request information, which is transmitted, when a voltage at an installation site of a voltage controller or a voltage sensor has deviated from an appropriate voltage range, for requesting a voltage controller to change target-voltage upper/lower limits and is received by the communication processing unit; and a target-voltage change-request-information generating unit to generate the target-voltage change-request information, which is transmitted, when a voltage at an installation site of a reactive-power-adjusting-type voltage control device controlled by the reactive-power-adjusting-type voltage controller deviates from the appropriate voltage range, from the communication processing unit so as to request a change of target-voltage upper/lower limits with respect to another voltage controller, wherein the communication processing unit transmits the received target-voltage change-request information further to another voltage controller.

8. A power-distribution-system voltage control system comprising:

a plurality of reactive-power-adjusting-type voltage controllers, each including a voltage adjusting unit to control reactive power output by the reactive-power-adjusting-type voltage control device such that a voltage at an installation site of a reactive-power-adjusting-type voltage control device to be controlled, which is connected to both or either of a high-voltage power distribution line and a low-voltage power distribution line is maintained within a range of target-voltage upper/lower limits, an arithmetic processing unit to calculate a reactive power integration value by integrating reactive power generated by the reactive-power-adjusting-type voltage control device for a preset time, and also a positive-maximum reactive-power integration value and a negative-maximum reactive-power integration value, by respectively integrating generatable positive maximum reactive power and negative maximum reactive power for the preset time, and a communication processing unit to periodically transmit reactive power generation data including the reactive power integration value, the positive-maximum reactive-power integration value, and the negative-maximum reactive-power integration value to a predetermined transformer-type voltage controller; and a transformer-type voltage controller including a communication processing unit to receive the reactive power generation data transmitted respectively from the plurality of the reactive-power-adjusting-type voltage controllers, a total value calculation unit to calculate a total reactive-power integration value that is a total of the reactive power integration values, a total positive-maximum reactive-power integration value that is a total of the positive-maximum reactive-power integration values, and a total negative-maximum reactive-power integration value that is a total of the negative-maximum reactive-power integration values, by using the reactive power integration values, the positive-maximum reactive-power integration values, and the negative-maximum reactive-power integration values in the reactive power generation data respectively received from the plurality of reactive-power-adjusting-type voltage control devices at a preset calculation cycle within a preset reception time; a margin calculation unit to calculate a positive reactive-power margin according to the total positive-maximum reactive-power integration value and the total reactive-power integration value, and calculate a negative reactive-power margin according to the total negative-maximum reactive-power integration value and the total reactive-power integration value; and a margin generation unit to change a tap position of a transformer-type voltage control device connected to the high-voltage power distribution line such that if the positive reactive-power margin is smaller than a positive-side threshold, the positive reactive-power margin becomes larger than the positive-side threshold, and changes the tap position of the transformer-type voltage control device such that if the negative reactive-power margin is smaller than a negative-side threshold, the negative reactive-power margin becomes larger than the negative-side threshold, wherein the margin generation unit does not change the tap position until a ratio of a number of pieces of the reactive power generation data received after changing the tap position to a number of pieces of the reactive power generation data received within the reception time becomes larger than a predetermined post-change ratio threshold.

\* \* \* \* \*